US005491670A

United States Patent [19]
Weber

[11] Patent Number: 5,491,670
[45] Date of Patent: Feb. 13, 1996

[54] SYSTEM AND METHOD FOR SONIC POSITIONING

[76] Inventor: T. Jerome Weber, 952 Trophy Dr., Mountain View, Calif. 94040

[21] Appl. No.: 278,678

[22] Filed: Jul. 21, 1994

Related U.S. Application Data

[63] Continuation of Ser. No. 7,641, Jan. 21, 1993, abandoned.

[51] Int. Cl.$^6$ .......................................................... G01S 3/80
[52] U.S. Cl. ............................................ 367/127; 367/128
[58] Field of Search ................................ 367/6, 124, 125, 367/126, 127, 910, 128; 364/449; 342/357; 365/516

[56] References Cited

U.S. PATENT DOCUMENTS

| | | |
|---|---|---|
| 2,946,054 | 7/1960 | Schneider . |
| 3,229,169 | 6/1961 | Deming . |
| 3,333,272 | 7/1967 | Deming . |
| 3,579,240 | 5/1971 | Deming . |
| 3,745,518 | 7/1973 | Barret et al. ................................ 367/6 |
| 3,754,187 | 8/1973 | Deming . |
| 3,754,189 | 8/1973 | Deming . |
| 3,754,192 | 8/1973 | Palfreeman . |
| 3,768,018 | 10/1973 | Deming . |
| 3,823,378 | 7/1974 | Deming . |
| 4,097,837 | 6/1978 | Cyr ............................................. 367/6 |
| 4,156,136 | 5/1979 | Strum et al. ............................. 367/910 |
| 4,516,226 | 5/1985 | Peynaud et al. ............................ 367/6 |
| 4,813,025 | 3/1989 | Rowland et al. ............................ 367/6 |

OTHER PUBLICATIONS

C. Biber, S. Ellin, E. Shenk, J. Stempeck, "The Polaroid Ultrasonic Imaging System", Oct. 1980, 67th Audio Engineering Society Convention, New York.

A. Zelinsky, "Mobile Robot Map Making Using Sonar", 1991, Journal of Robotic Systems 8(5), pp. 557–577.

Roman Kuc, Victor Brian Viard, "A Physically Based Navigation Strategy for Sonar–Guided Vehicles", Apr. 1991, The International Journal of Robotics Research.

Hisashi Suzuki, Suguru Arimoto, "Visual Control of Autonomous Mobile Robot Based on Self–Organizing Model for Pattern Learning", Oct. 1988, Journal of Robotic Systems, 5(5), pp. 453–470.

Tod S. Levitt, Daryl T. Lawton, "Qualitative Navigation for Mobile Robots", 1990, Artificial Intelligence 44 (1990) pp. 305–360, v44, No. 3, Holland.

Magellan Systems Corporation, "The Magellan NAV 1000 PRO", May 1981 product announcement, San Dimas, CA.

Visitect Inc., "Miniature Transmitters and Receivers", Aug. 1992 product advertisement, Nuts and Volts Magazine, p. 85.

Motorola Inc., "Remote Control Circuits", Motorola Semiconductor Master Selection Guide SG73/D Rev. 5, pp. 4.8–6, 1992.

*Primary Examiner*—Daniel T. Pihulic
*Attorney, Agent, or Firm*—Skjerven, Morrill, MacPherson, Franklin & Friel; David W. Heid; William L. Paradice, III

[57] ABSTRACT

A system and method for determining the position of an automatically guided vehicle within a workspace is disclosed which operates by detecting sounds generated by beacons placed within the workspace. The time for the beacon sounds to reach the vehicle is measured and a distance to each beacon is determined. From these measured distances and the known positions of the beacons, the vehicle can determine its relative position.

43 Claims, 21 Drawing Sheets

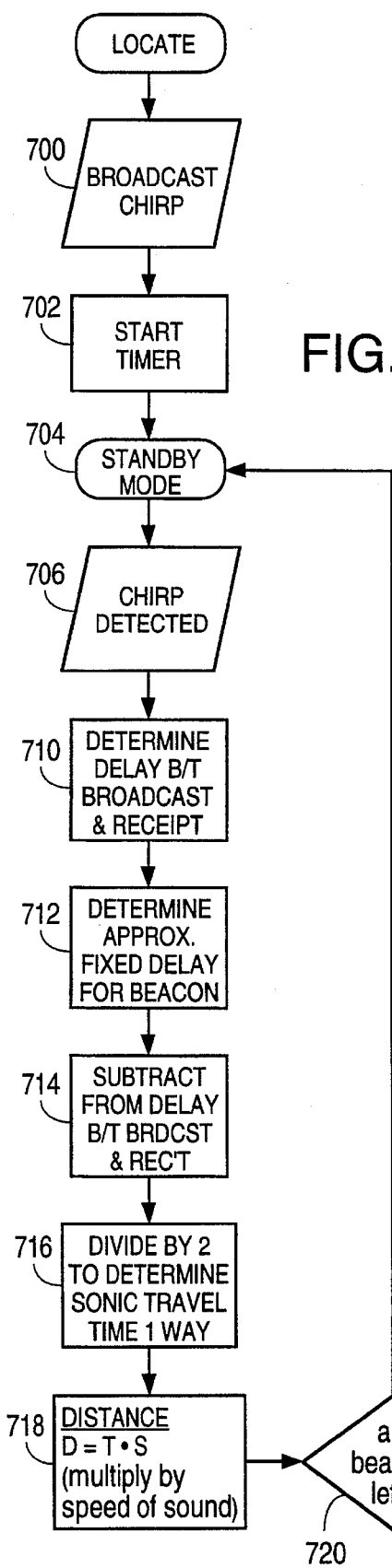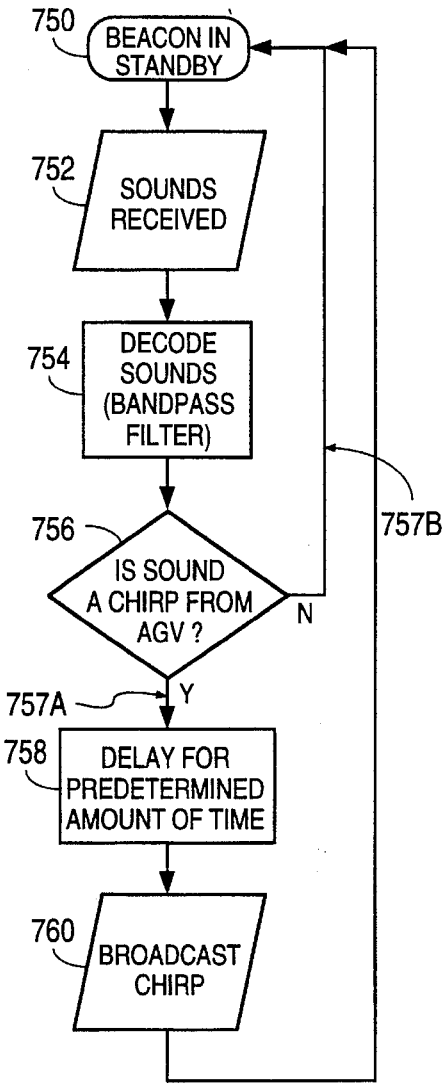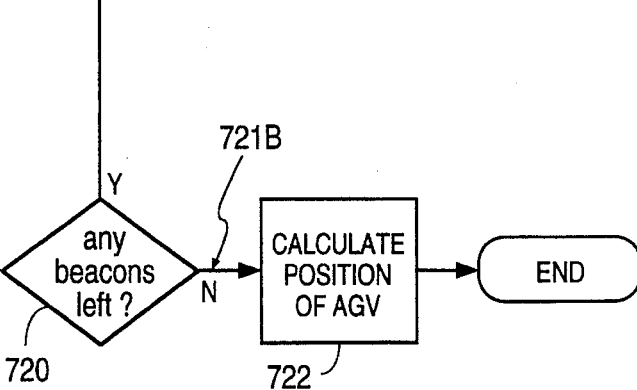
FIG. 7A
FIG. 7B

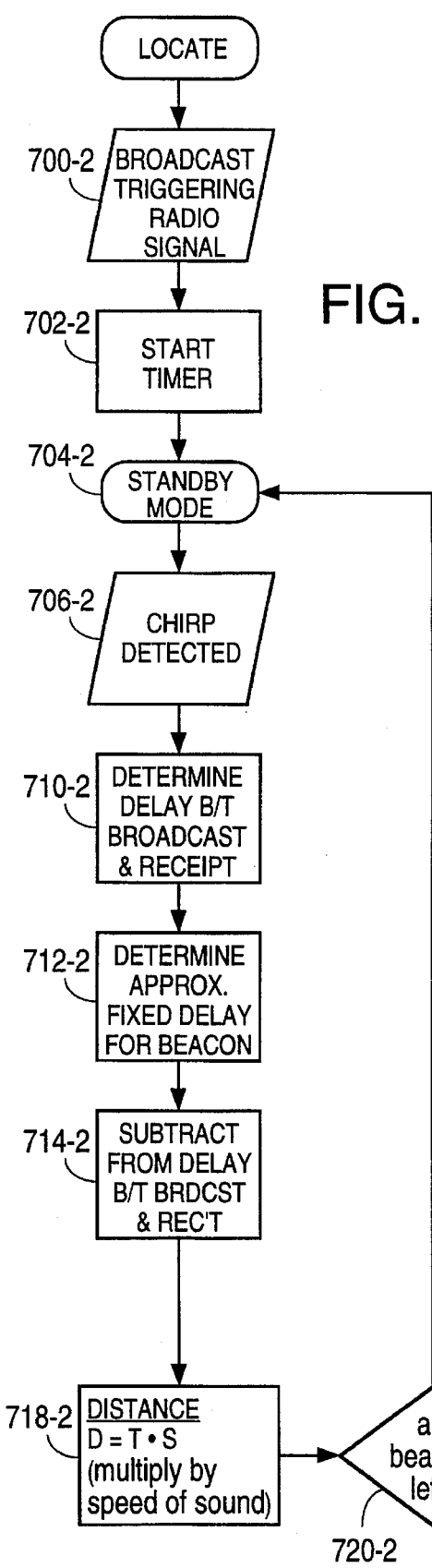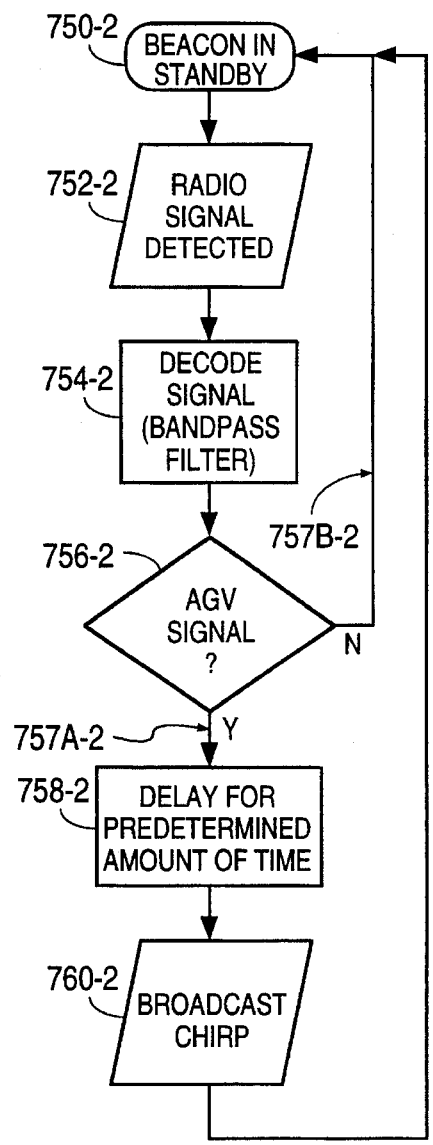
FIG. 7C
FIG. 7D

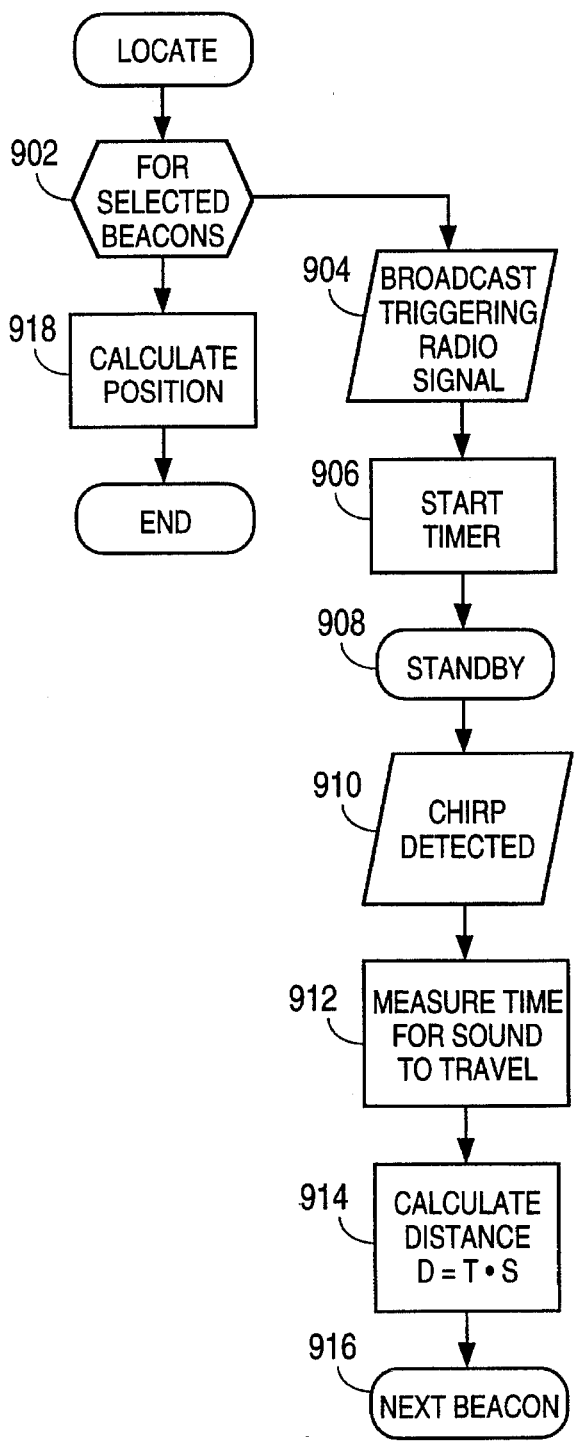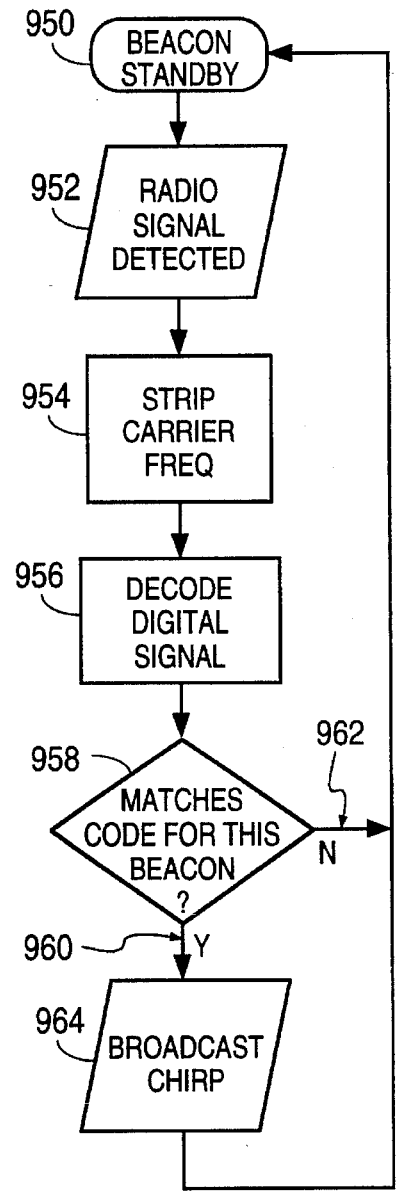
FIG. 9A
FIG. 9B

SYSTEM AND METHOD FOR SONIC POSITIONING

This application is a continuation of application Ser. No. 08/007,641, filed Jan. 21, 1993, now abandoned.

BACKGROUND OF INVENTION

1. Field of the Invention

This invention relates to a sonic positioning system, in particular, a sonic positioning system for precisely determining the position of an automatically guided vehicle relative to the vehicle's environment.

2. Description of the Related Art

A significant problem hindering the development of automatically guided vehicles (AGV(s)) is that of determining position of a given AGV within the AGV's normal operating space. It is to be understood that the present invention is not limited to the position determination of AGVs but determines the position of any object utilizing a system constructed in accordance with this invention. For example, a robotic AGV whose function is to store and retrieve objects in a large warehouse must navigate the aisles and corridors of the warehouse and place objects into and retrieve objects from appropriate bins, or an automated vacuum cleaner must traverse an entire floor space without undue redundancy.

One method that is old in the art for determining the position of an AGV within a given work space is one in which the AGV tracks its own movement by maintaining records of position, direction and movement information. Such a method is commonly called "dead reckoning." In dead reckoning, the new position is determined from the AGV's previous position, the AGV's direction and the distance travelled by the AGV since its last position was determined. An AGV's new direction is calculated from the AGV's previous direction and the change in direction caused by the turning of the AGV. Each new calculation of position and/or direction introduces a small error. For the first few steps, dead reckoning is fairly accurate, however, as an AGV constantly recalculates the position and direction, errors quickly accumulate to significant levels and position and direction information of the AGV quickly becomes meaningless.

Another way that prior art AGVs determine position is by following lines from one known place to another known place. In a line-following system, every path the AGV is capable of taking is marked by painting lines on the floor which the AGV optically senses and follows, or by laying guide wires under the floor which the AGV electronically or otherwise senses and follows. Such a line-following system requires extensive preparation and is difficult to change or adapt. Additionally, causing an AGV to lose track of the line followed by the AGV disrupts the AGV to such an extent that the AGV cannot resume transit to the AGV's destination.

A third method by which AGVs attempt to navigate within their environment is through the use of video cameras or sonic transducers with which the AGV attempts to "see" the surrounding environment. The AGV determines position within the workspace by attempting to recognize landmarks within the workspace. However, such a system is of limited utility in environments which change with time. Current landmark recognition systems look for large, high-contrast objects to serve as landmarks. For example, for an optical landmark recognition system for guiding a vehicle through the streets of a city, other vehicles and pedestrians may have more distinctive shapes and color contrasts than traffic signals, traffic signs and signs bearing the names of streets. Selecting other vehicles and pedestrians as landmarks would render such a system useless since other vehicles and pedestrians are mobile and will have moved before the AGV passes by the position identified by such landmarks at some later time. Furthermore, landmark recognition systems often require excessively complex artificial intelligence logic. The time required to process a video image and to scan that image for any of a number of landmark images is substantial, causing the AGV to travel slowly and to hesitate frequently in repeated attempts to recognize landmarks. Additionally, the complexity of such computations requires a significant amount of computer hardware, making such a system potentially viable only for larger, heavier and more costly AGVs.

Similar to the optical landmark recognition system is the sonic echo location system in which a sonic chirp is generated and the time it takes the chirp to echo back is measured to calculate the distance to the object from which the chirp is reflected. Such a system is relatively accurate in judging the distance to an object as the speed of sound through air is essentially independent of relative humidity and air pressure and only slightly affected by temperature. While such a system may be quite useful for the purpose of collision avoidance as objects in an AGV's path may be effectively detected by an echo-location system, such a system provides no information as to the AGV's current position or direction. Additionally, inaccurate or misleading information may result from multiple chirp echoes being detected by such a system in complex surroundings (especially in corners) or from sonic waves reflecting off of smooth surfaces and not returning to the sonic source (e.g., a smooth surface such as glass that is as little as 7° from perpendicular from the direction of sound waves from the AGV will reflect the waves away from the AGV so as to go undetected, giving an inaccurate "view" of the AGV's surroundings).

Another way AGVs may currently determine position is by signalling member satellites of the global positioning system (GPS), now being developed and implemented by the United States Department of Defense, and calculating from the responses of those satellites the latitude and longitude of the AGV's current position. However, such a system is generally too inaccurate for most AGV applications. Results are currently accurate to within 3 meters at best and usually only to within 15 to 30 meters. Such large errors are unacceptable as errors of such magnitude may cause an AGV to enter the wrong room or retrieve objects from the wrong bin.

In addition to inadequate accuracy, GPS systems are generally too slow for most AGV applications. It generally takes as long as 3 minutes to determine a position. Preferably, AGVs should move about relatively quickly and without hesitation. While some hesitation for determining position is acceptable under certain circumstances, pauses of up to 3 minutes are clearly unreasonable for many AGV applications. Some GPS systems offer position updates every two and a half seconds. Even such systems are too slow for a continuously and quickly moving AGV operating within a small area.

Additionally, GPS systems are generally less useful indoors as the radio frequency field is often distorted by the geometry and contents of buildings.

What is needed is a system for determining the position of an AGV that is accurate to within a few centimeters in a given operating space. Such a system should produce position information quickly, e.g., on the order of 200 milliseconds or less. Furthermore, such a system should be inexpensive and compact so that it may be used in small household robots.

SUMMARY OF INVENTION

In accordance with the present invention, a system is provided for quickly determining the position of an object within a given space, such position being accurate within a few centimeters and being ascertainable within an amount of time of the order of a few hundred milliseconds.

An object, typically an AGV, determines its distance from a beacon in the following manner: the beacon, whose position is known with respect to an arbitrary coordinate system broadcasts a sonic burst or chirp at a time known to the AGV. Some time later, the chirp is received by the AGV. By measuring the time between the sending of the chirp by the beacon and the receipt of the chirp by the AGV, and by knowing the speed of sound through the air, the AGV calculates the distance between the AGV and the beacon.

By determining the distance from three separate beacons, an AGV determines its position within the plane occupied by those three beacons. By knowing the distance to a fourth beacon, which is outside the plane of the other three beacons, the AGV determines its position within a three-dimensional space.

Implementation of such a system requires that sonic beacons be positioned throughout the space that the AGV would be expected to navigate, such that at every position within such a space at least three beacons are within AGV's sonic range (if position within a three-dimensional space is required, at least four non-coplanar beacons must be within sonic range of the AGV). Before the system can operate properly, the position of each beacon with respect to an arbitrary coordinate system and a unique identification of each beacon must be given to the AGV.

It should be noted that it is not absolutely imperative that for each possible position of the AGV, three different beacons are within sonic range. For example, measuring the distance between the AGV and two respective beacons produces two possible AGV positions. If the logic of the AGV can eliminate one of the positions as impractical, the AGV may accurately determine its position using only two beacons. For example, if an AGV measuring distance between itself and two separate beacons determines it is either at position A (inside the room known to contain the AGV) and position B (outside that room), the AGV can accurately determine that it is at the position A. Additionally, an AGV may verify a position calculated by other means by measuring the distance between the AGV and one beacon.

As discussed above, the AGV must know at what time each beacon broadcasts its sonic chirp. Otherwise, the time it takes the chirp to travel from the beacon to the AGV could not be measured.

In a first embodiment of the present invention, the AGV triggers the beacons to produce a sonic chirp by the AGV's broadcasting of a sonic chirp detectable by the respective beacons. Upon broadcasting the sonic chirp, the AGV starts a timer. To aid the AGV in distinguishing among the various returning chirps of the various responding beacons and perhaps the echoes of the triggering chirp of the AGV, each beacon is assigned a unique period of delay, such that only one beacon will respond at a time, all beacons responding in a predetermined order. The elapsed time of the timer is noted upon the detection of the beacon chirps. The AGV then determines the distance from each beacon knowing the time to twice traverse the distance between the AGV and the beacon and the particular time delay of each beacon.

In another embodiment, the AGV distinguishes echoes of the sonic triggering chirp from the answering beacon chirps by broadcasting a sonic triggering chirp at frequencies distinct from the frequencies in which the beacons respond.

Several embodiments utilize a radio link. The robot broadcasts a radio signal that triggers the beacon to return a sonic signal. The radio signal is encoded such that individual beacons can be triggered separately from the rest. This helps identify the particular beacon. Since the time of propagation of the radio signal is very small compared to the propagation time of the sonic signal, the radio's propagation time can be considered instantaneous.

It is easier and better to trigger individual beacons by encoding a radio link than attempting to encode the sonic signals.

The satellite navigation system, mentioned above, established by the military, the "Global Positioning System" (GPS), uses a very precise clock and a look-up position table to allow world-wide navigation. This satellite system is not usable by most robots, but the concept of a precision clock could be adapted to the sonic beacons. In this embodiment both the beacon and the robot are equipped with synchronized clocks. Each beacon is set to "chirp" at a predetermined time. Measuring the time between the emanation from the beacon and the receipt of the chirp by the robot allows the distance to the beacon to be determined.

The frequency and duration of the "chirp" are selected somewhat arbitrarily. Because human beings are likely to co-exist with the AGV, the parameters of the chirp are selected so as to preserve the comfort and convenience of human beings operating in the same environment. Setting the frequency of the chirp in the ultrasonic range (i.e., well above the range of human hearing) makes the sonic chirps undetectable to people. Keeping the duration short minimizes the disturbance to pets and other animals whose range of hearing may include the frequency of the chirp.

Polaroid Corporation discloses an ultrasonic sonar which operates at frequencies near 50 kHz. See C. Biber et al., "The Polaroid Ultrasonic Ranging System", *Audio Engineering Society* Document No. 1696(A-8) (presented at the 67th AES Convention) (1980). These parameters are appropriate for the beacons in this invention.

Since sound waves propagate through the AGV's environment to varying degrees depending largely on the frequency of the sound waves, it is preferred that the chirp be composed of several unique frequencies so that, if one frequency is absorbed by a wall or barrier, another frequency has a significant likelihood of being received by the AGV. Similar reasoning lead Polaroid to broadcast at four different frequencies with their sonar (i.e., 60, 57, 53, and 49.7 kHz) (see Biber et al.). Since most AGV operating systems would use both a positioning system in accordance with this invention and either the Polaroid sonar or something similar (e.g., for collision avoidance), it is preferred that the positioning system use frequencies distinct from the sonar's broadcast frequencies.

As previously stated, an AGV must know not only the distance to each beacon, but also the position of each beacon in order to determine the AGV's position within the workspace. The simplest method by which beacon position information entered into the AGV is by manual data entry by a human operator by any suitable means (e.g., by providing a key pad on the AGV by which numerical data is entered into and stored in the AGV). In a preferred embodiment, however, distance information between the respective beacons and between the AGV and each beacon is obtained by asking each beacon in turn to assume the role of an AGV measuring the respective distances to each other beacon and to the AGV in very much the same way the AGV normally operates. A Cartesian coordinate system is then imposed upon the workspace. The origin of the Cartesian coordinate system is arbitrarily assigned to the current position of the AGV. An orientation is arbitrarily assigned to the Cartesian coordinate system by placing a first beacon on an axis. A scale is arbitrarily assigned to the Cartesian coordinate system by assigning to the first beacon the position $(0,d_1)$, where $d_1$ is the distance from the first beacon to the AGV. From the arbitrarily imposed Cartesian coordinate system, the assigned positions of the AGV and one beacon and the distance information obtained, the position of each beacon within the workspace in terms of the imposed Cartesian coordinate system may be determined.

Alternatively, using instrumentation expected to exist in the system, the AGV can locate the beacons and arbitrarily assign a Cartesian coordinate system to the workspace by polling the distances to nearby beacons from several known locations or orientations.

A logical extension of this same basic idea is to have the vehicle emit a sonic signal and the beacons act as receivers. The math and hardware would be similar but the vehicle would be simpler. The beacons could be tied to a central computer used to determine the locations of the AGV and said information transmitted to the robot.

BRIEF DESCRIPTION OF THE DRAWINGS

The present invention is illustrated in the accompanying drawings wherein:

FIG. 7A is a flow diagram showing the operation of an AGV in accordance with one embodiment of the present invention.

FIG. 7B is a flow diagram showing the operation of a beacon in accordance with one embodiment of the present invention.

FIG. 7C is a flow diagram showing the operation of an AGV in accordance with one embodiment of the present invention.

FIG. 7D is a flow diagram showing the operation of a beacon in accordance with one embodiment of the present invention.

FIG. 9A is a flow diagram showing the operation of an AGV in accordance with one embodiment of the present invention.

FIG. 9B is a flow diagram showing the operation of a beacon in accordance with one embodiment of the present invention.

DETAILED DESCRIPTION OF THE PREFERRED EMBODIMENTS

Figure 1:
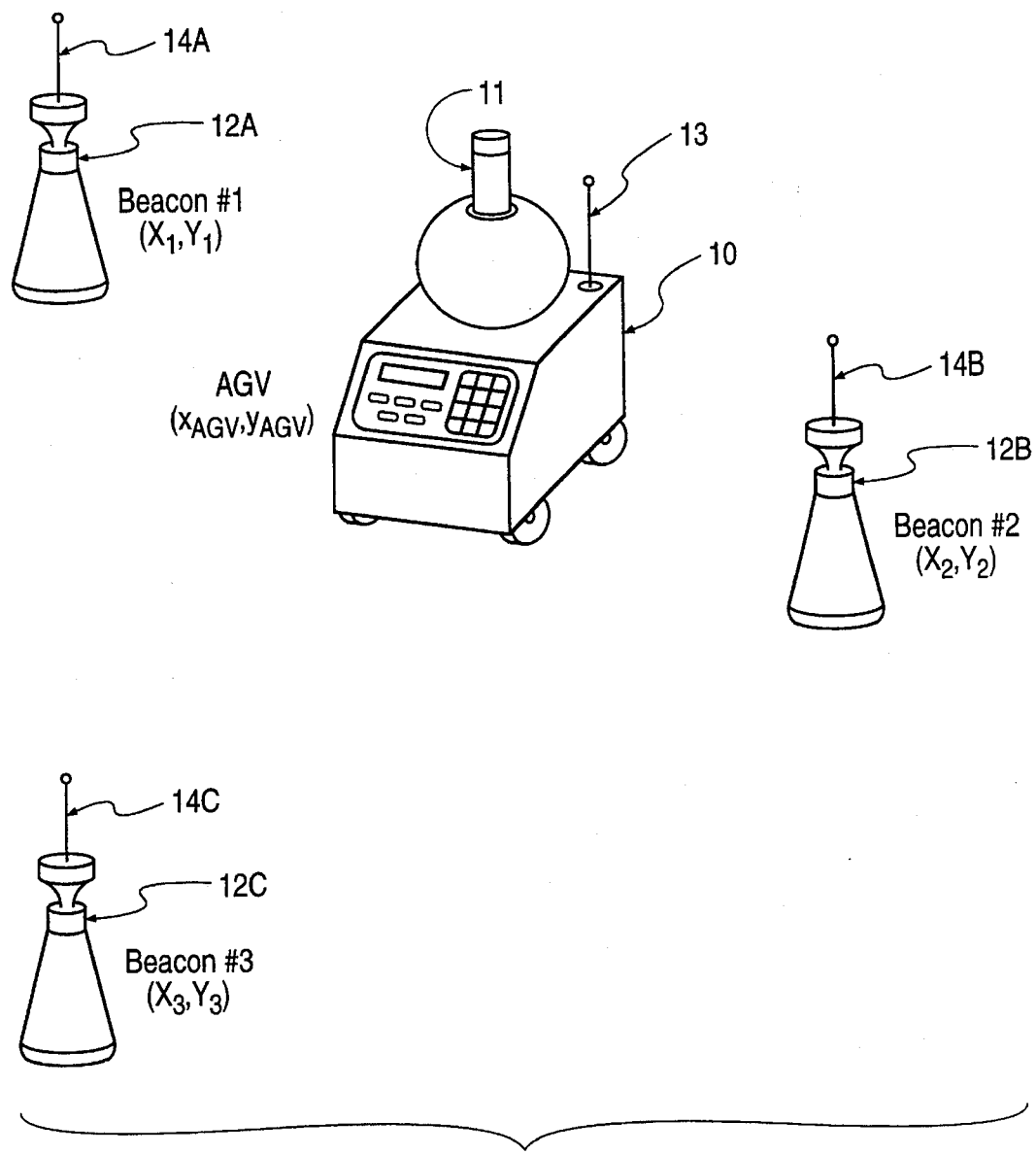
FIG. 1 is a perspective view of a robot or AGV and three sonic beacons which incorporate the features of this invention.

A robot or AGV which is to determine its position within a given workspace may take any convenient or desired shape or size, for example, the wheeled robotic vehicle 10 shown in FIG. 1. AGV 10 is provided with an omni-directional microphone 11 which allows it to receive and interpret sonic signals emanating from sonic beacons 12a, 12b and 12c. Some embodiments of this invention require that the AGV be equipped with a radio antenna 13 and that each of the beacons be similarly equipped with antennae 14a, 14b and 14c. Normally these antennae 13, 14a, 14b and 14c are hidden within the bodies of the AGV 10 and beacons 12a, 12b and 12c, but are shown exposed in this figure for clarity.

Figure 2:
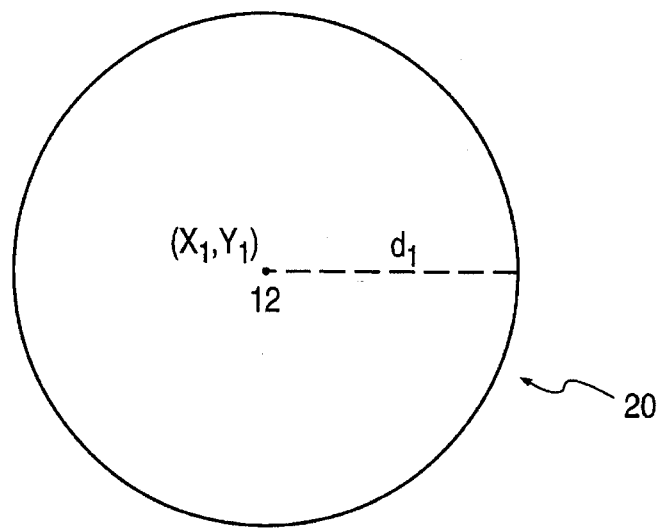
FIG. 2 is a diagram showing the AGV position determination process with respect to a first beacon.

In accordance with this invention, AGV 10 determines its position by first knowing or determining the coordinate position of each beacon (e.g., beacons 12a, 12b and 12c) and then measuring the distance to each beacon by measuring the time that a sonic signal takes to travel from each beacon to the AGV 10. Referring to FIG. 2, with reference to some arbitrary coordinate system, the position $(x_1, y_1)$ of beacon 12 is known by the AGV. The position $(x_1, y_1)$ of beacon 12 may be entered into the AGV by a human operator or may be established by other means (see discussion below regarding one method for beacon position determination.)

The distance between beacon 12 and AGV 10 is measured in the following way. First, the beacon broadcasts a short sonic burst or "chirp" ("sonic burst," "sonic chirp,", and "chirp" are used interchangeably herein) at a time known to the AGV (synchronization of beacon chirping is discussed below). The sonic chirp is then received by the AGV at some later time. The AGV measures the time during which the sonic chirp travelled from the beacon to the AGV. The resulting sonic travel time is multiplied by the speed of sound through the air to determine the distance between beacon 12 and the AGV. The position of the AGV is then known to be some point on the circle 20 of FIG. 2 given by the equation:

$$d_1^2 = (x_{AGV} - x_1)^2 + (y_{AGV} - y_1)^2,$$

where $d_1$ is the distance measured between beacon 12 and AGV 10 and $(x_1, y_1)$ is the position of beacon 12 and $(x_{AGV}, y_{AGV})$ is the position of AGV 10.

Figure 3:
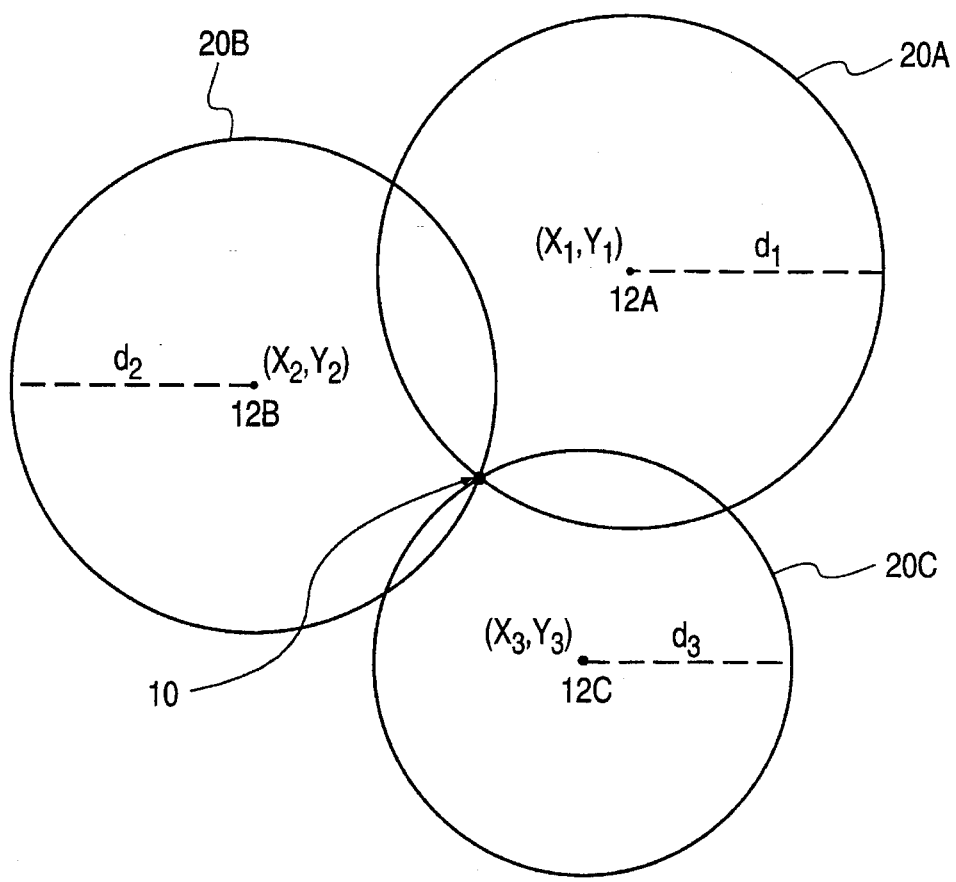
FIG. 3 is a diagram showing AGV position determination with three beacons in accordance with several embodiments of the present invention.

Placing three coplanar, non-collinear beacons 12a, 12b and 12c in or around the AGV's workspace and determining the distances $d_1$, $d_2$ and $d_3$ between the respective beacons and the AGV 10, produces equations similar to equation (1) above for three circles 20a, 20b and 20c on each of which AGV 10 must lie. In a two-dimensional space, these three circles 20a, 20b and 20c will intersect in only one place, the location of AGV 10, as illustrated in FIG. 3. However, if beacons 12a, 12b, and 12c were collinear, circles 20a, 20b, and 20c would intersect in two places, giving an ambiguous solution.

Figure 4:
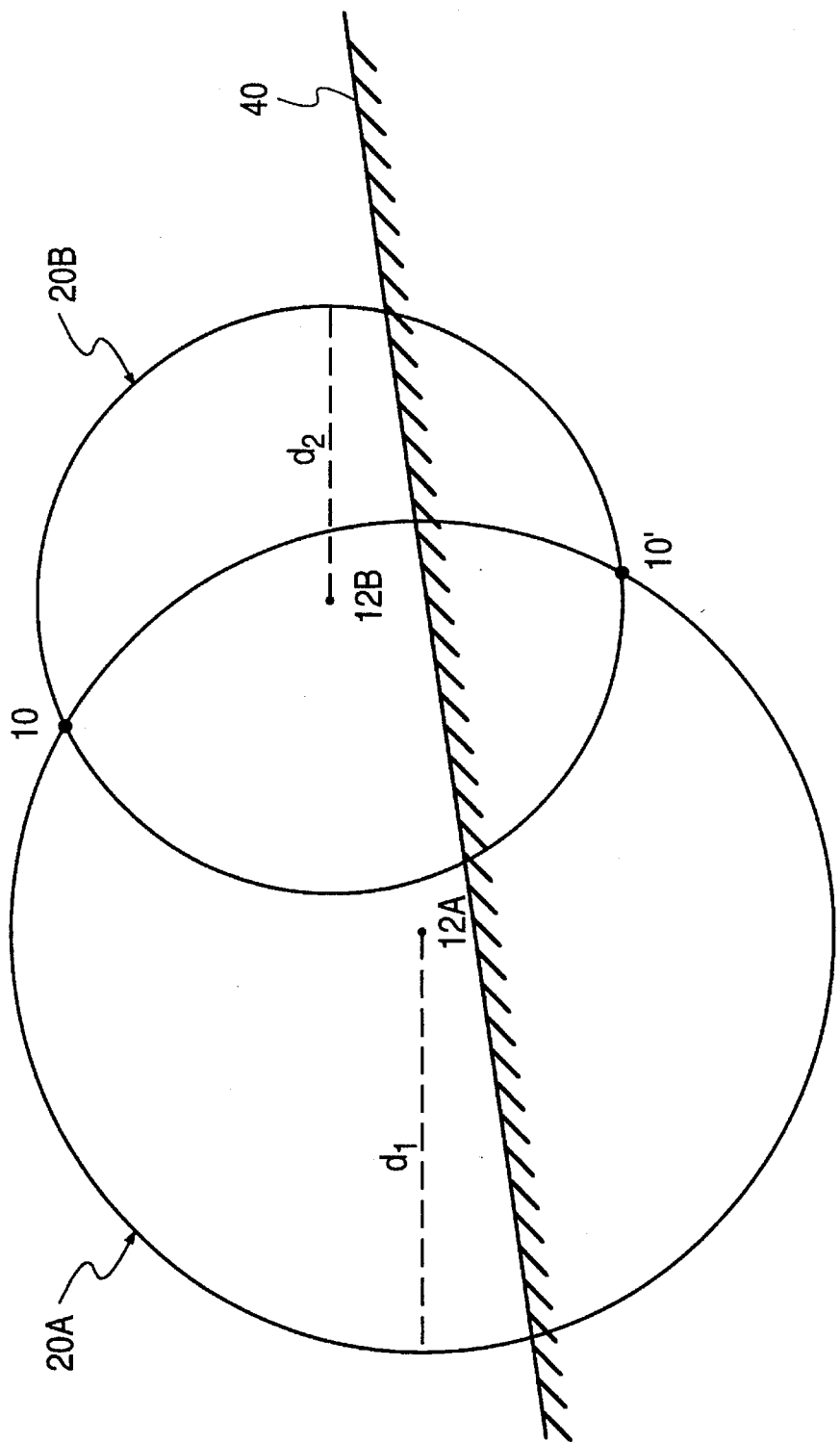
FIG. 4 is a diagram showing AGV position determination with two beacons in accordance with an embodiment of the present invention.

Under certain circumstances, an AGV 10 may determine its location in a two-dimensional space with certainty by knowing the position of and distance to only two beacons 12a and 12b as shown in FIG. 4. In general, two non-concentric circles may intersect at two points, at one point or at no point. That circles 20a and 20b might intersect at no point is inconsistent with the hypothesis that AGV 10 is positioned somewhere on circles 20a and 20b simultaneously. Thus, the possibility that the two circles do not intersect is eliminated. If AGV 10 were at some point along the line passing through both beacons 12a and 12b, circles 20a and 20b would intersect at exactly one point, namely the position of AGV 10. However, most often circles 20a and 20b will intersect at two points 10 and 10' as shown in FIG. 4. If AGV 10 is able to reasonably exclude either position 10 or position 10', then AGV 110 may determine its position in two-dimensional space relative to beacons 12a and 12b with relative certainty. AGV 10 may reasonably exclude position 10' by recognizing that position 10' is beyond impenetrable barrier 40 or by recognizing that the AGV has moved only a few centimeters from its most recent position which is centimeters from position 10 and meters from position 10'.

Figure 5A:
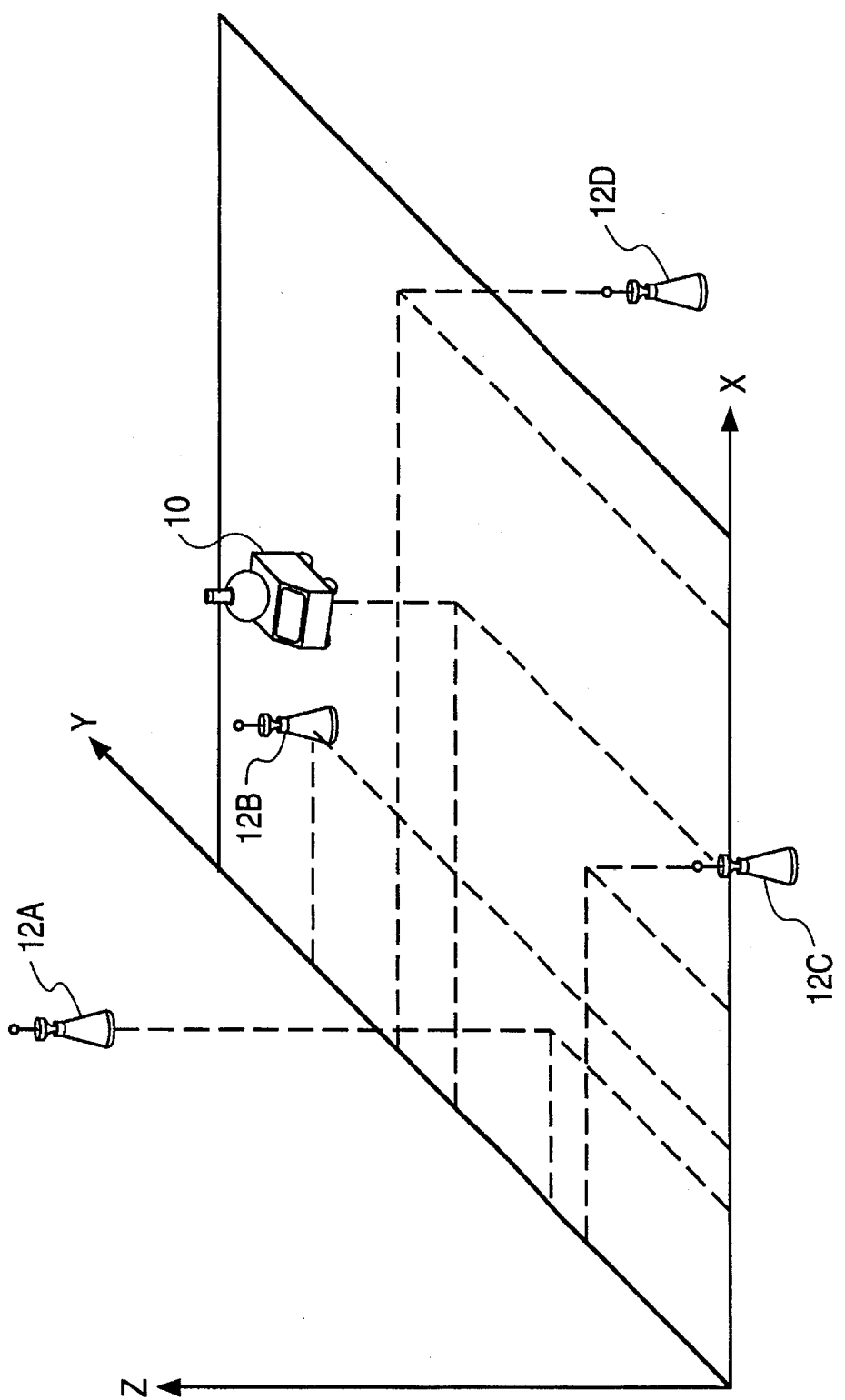
FIG. 5A is a perspective view of a configuration for determining the position of an AGV in a three-dimensional workspace in accordance with one embodiment of the present invention.

Referring to FIGS. 5A, 5B, 5C and 5D, determination of AGV 10's position in a three-dimensional workspace is discussed. Beacons are placed as shown in FIG. 5A such that the four beacons are not coplanar and no three beacons are collinear.

Figure 5B:
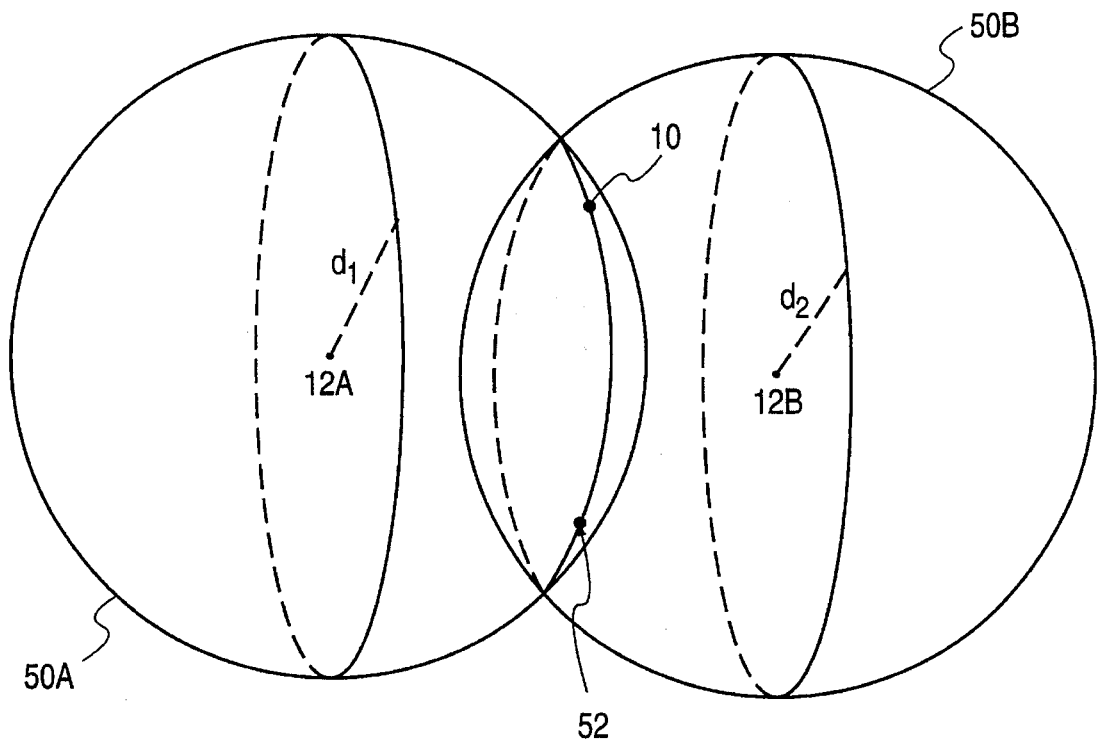
FIG. 5B is a diagram showing part of the AGV position determination process in a three-dimensional workspace using the first two beacons in accordance with one embodiment of the present invention.

Referring now to FIG. 5B, the position of AGV 10 is known to be at some point on the sphere whose center is the location of a beacon of known position (e.g., beacon 12a) and whose radius is the distance between that beacon and AGV 10 (e.g., distance $d_1$). By knowing the position of, and distance to, two beacons (e.g., beacons 12a and 12b), the position of AGV 10 is known to be at some point along the intersection of the two spheres 50a and 50b. The intersection of two nonconcentric spheres is a circle (e.g., circle 52 of FIG. 5b). As discussed above with two-dimensional positioning, there is a special case in which two nonconcentric spheres intersect at a single point (i.e., a circle of radius 0) and that point would be the position of AGV 10. Thus, aside from the rare special case, AGV 10 is known to be positioned somewhere on circle 52. The possibility that the two spheres do not intersect is ignored for the same reasons given above.

Figure 5C:
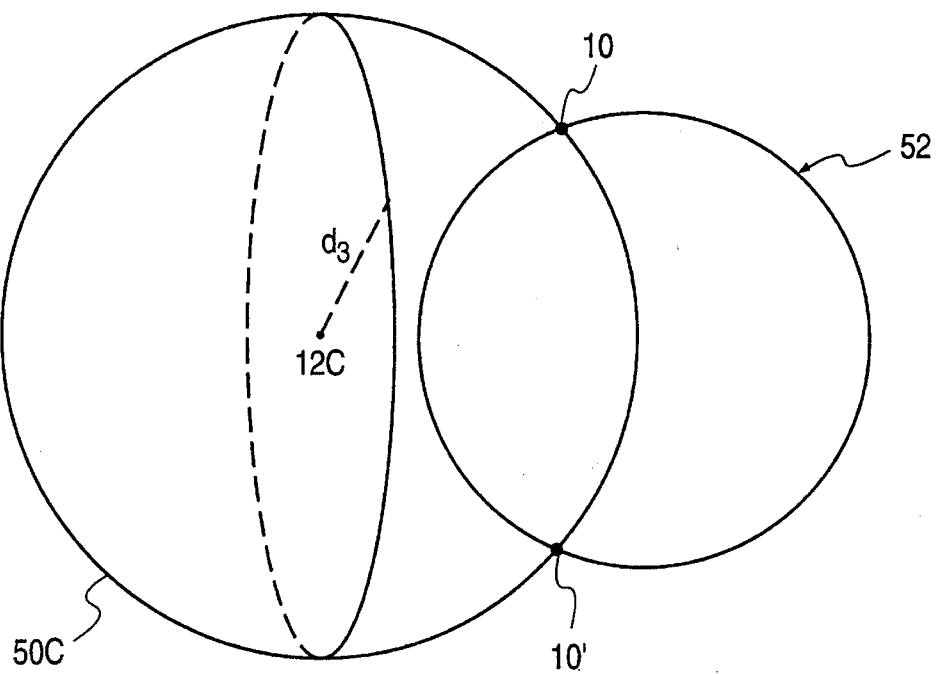
FIG. 5C is a diagram showing part of the AGV position determination process in a three-dimensional workspace with respect to a third beacon in accordance with one embodiment of the present invention.

Referring now to FIG. 5C, a third beacon 12c whose position $(x_3, y_3)$ and distance d3 from the AGV is known. Since the third beacon is at the center of sphere 50c, which is not on the line connecting respective centers 12a and 12b of spheres 50a and 50b of FIG. 5b, sphere 50c will intersect circle 52 at two points 10 and 10'. In the special case that AGV 10 lies in the plane of beacons 12a, 12b and 12c, the intersection of sphere 50c and circle 52 would be a single point, namely the position of AGV 10. That special case aside, and absent any special knowledge which would enable elimination of either point 10 or point 10' as a possible position of AGV 10 (see discussion above regarding FIG. 4), the position of and distance to a fourth beacon (e.g., beacon 12d of FIG. 5A and FIG. 5D) is needed to determine the position of AGV 10.

Figure 5D:
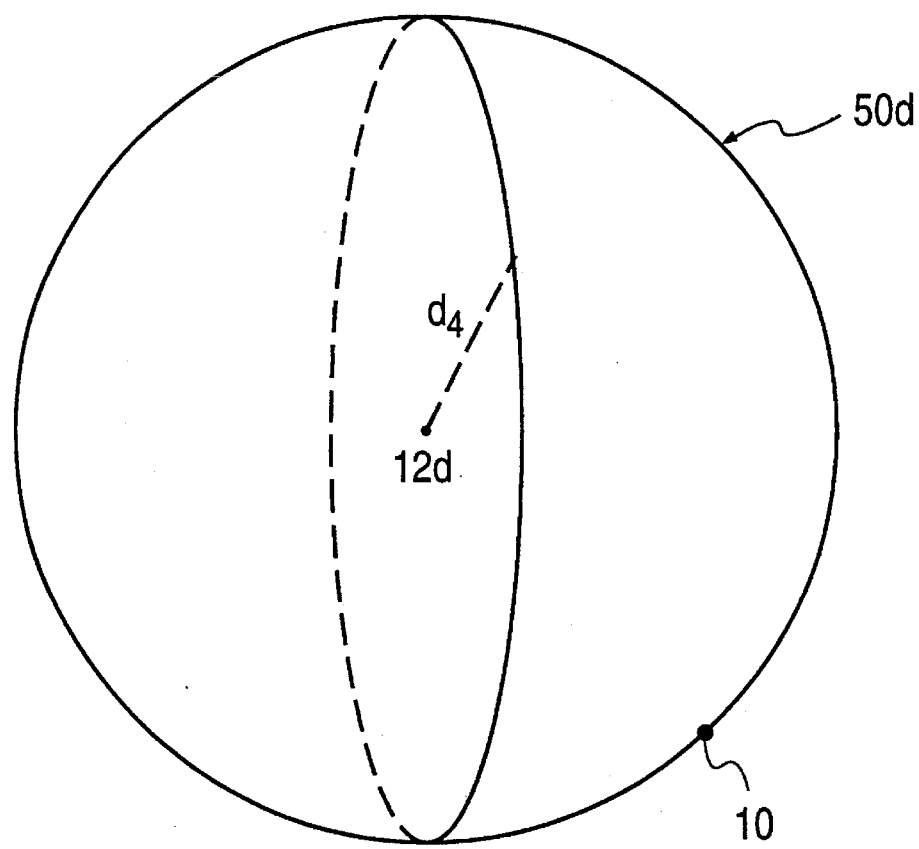
FIG. 5D is a diagram showing part of the AGV position determination process in a three-dimensional workspace with respect to a fourth beacon in accordance with one embodiment of the present invention.

With respect to FIG. 5D, AGV 10 is known to be positioned at some point on sphere 50d, whose center is the location of beacon 12d and whose radius $d_4$ is the distance from AGV 10 to beacon 12d. As beacon 12d is not in the plane of beacons 12a, 12b and 12c, sphere 50d will contain only one of the points 10 and 10'. The point contained in sphere 50d (i.e., point 10 in FIG. 5D) is the position of AGV 10.

AGV 10 must be able to distinguish sonic chirps received from beacons (e.g., beacons 12a, 12b and 12c of FIG. 1) from other sounds the AGV 10 may detect in its environment. Therefore, each beacon broadcasts a sonic chirp of a specific, known frequency (or a number of specific, known frequencies).

As discussed above, it is preferred that the sonic chirp be broadcast at multiple frequencies in the range of 40–60 kHz.

Figure 13:
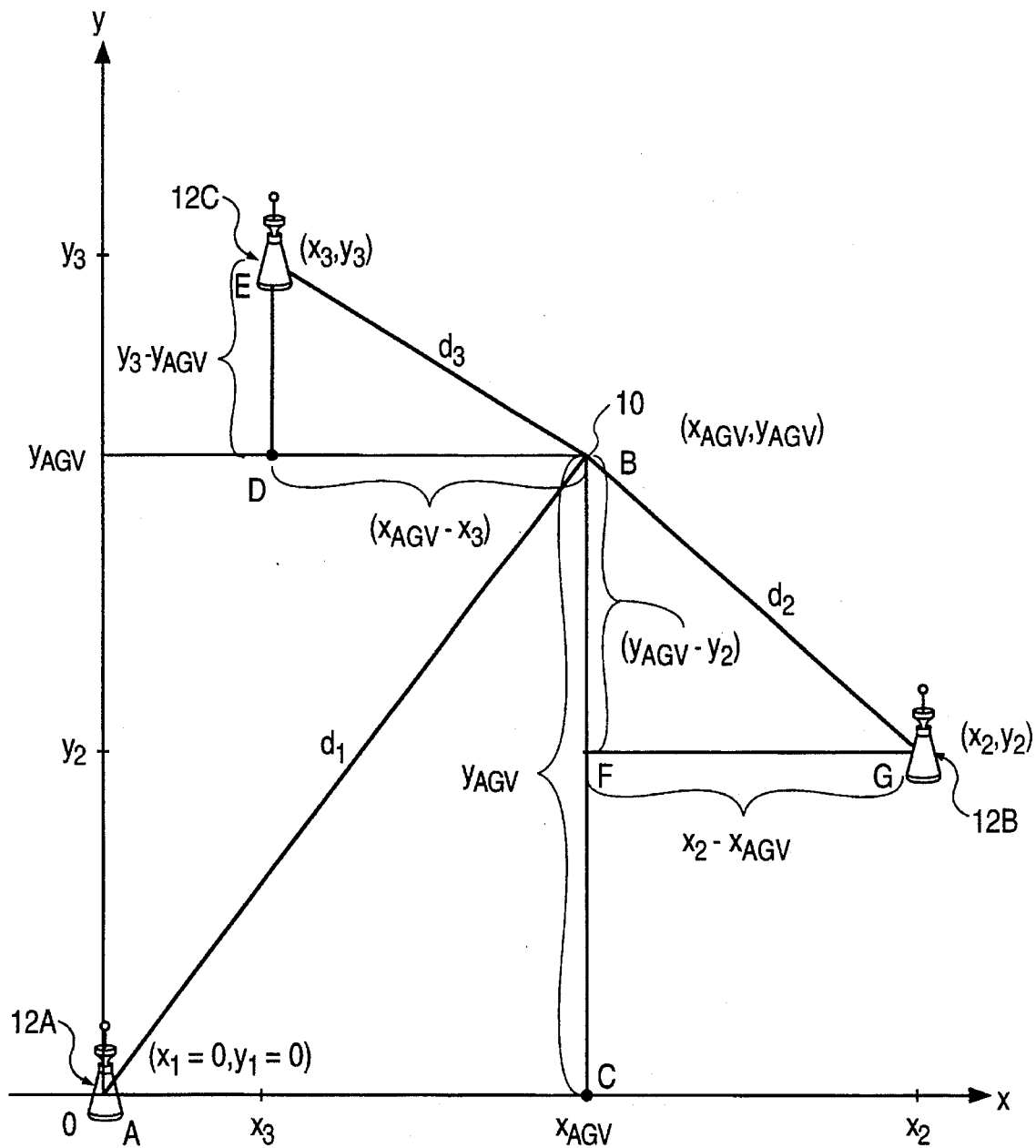
FIG. 13 is a diagram showing AGV position determination from beacon distances and positions in an arbitrarily imposed coordinate system in accordance with one embodiment of the present invention.

Given the distances $d_i$ to each of the beacons and the positions $x_i, y_i$ of each beacon i in some arbitrarily imposed coordinate system, the AGV can determine its position $x_{AGV}, y_{AGV}$ by any one of a variety of methods. One such method is described with reference to FIG. 13. In FIG. 13, an x,y coordinate system is arbitrarily oriented with an origin at the point A (0,0) situated at the location of one beacon 12a. Beacons 12b and 12c are shown located at points G ($x_2,y_2$) and E ($x_3,y_3$) respectively. The AGV 10 is shown at point B ($x_{AGV},y_{AGV}$). It can be seen that triangles ABC, BDE and BGF are right triangles. The Pythagorean relation then yields the equations:

$$y_{AGV}^2 + x_{AGV}^2 = d_1^2$$

$$(x_2 - x_{AGV})^2 + (y_2 - y_{AGV})^2 = d_2^2$$

$$(x_3 - x_{AGV})^2 + (y_3 - y_{AGV})^2 = d_3^2$$

One can then solve for the AGV's position $x_{AGV}$ and $y_{AGV}$ to obtain:

$$x_{AV} = \sqrt{1 - Y_{AV}}$$

and $$Y_{AGV} = \frac{x_3(d_1^2 - d_2^2 + x_2^2 + y_2^2) - x_2(d_1^2 - d_3^2 + x_3^2 + y_3^2)}{2(x_3 y_2 - x_2 y_3)},$$

To determine the sonic chirp's travel time from the beacon to the AGV, the AGV must know both the time at which the sonic chirp was received and the time at which the sonic trip was sent by the beacon. In a first embodiment of the present invention, the AGV initiates the position determination process by emitting a sonic chirp which is received by a number of beacons, each of which responds in turn with a sonic chirp.

Figure 6A:
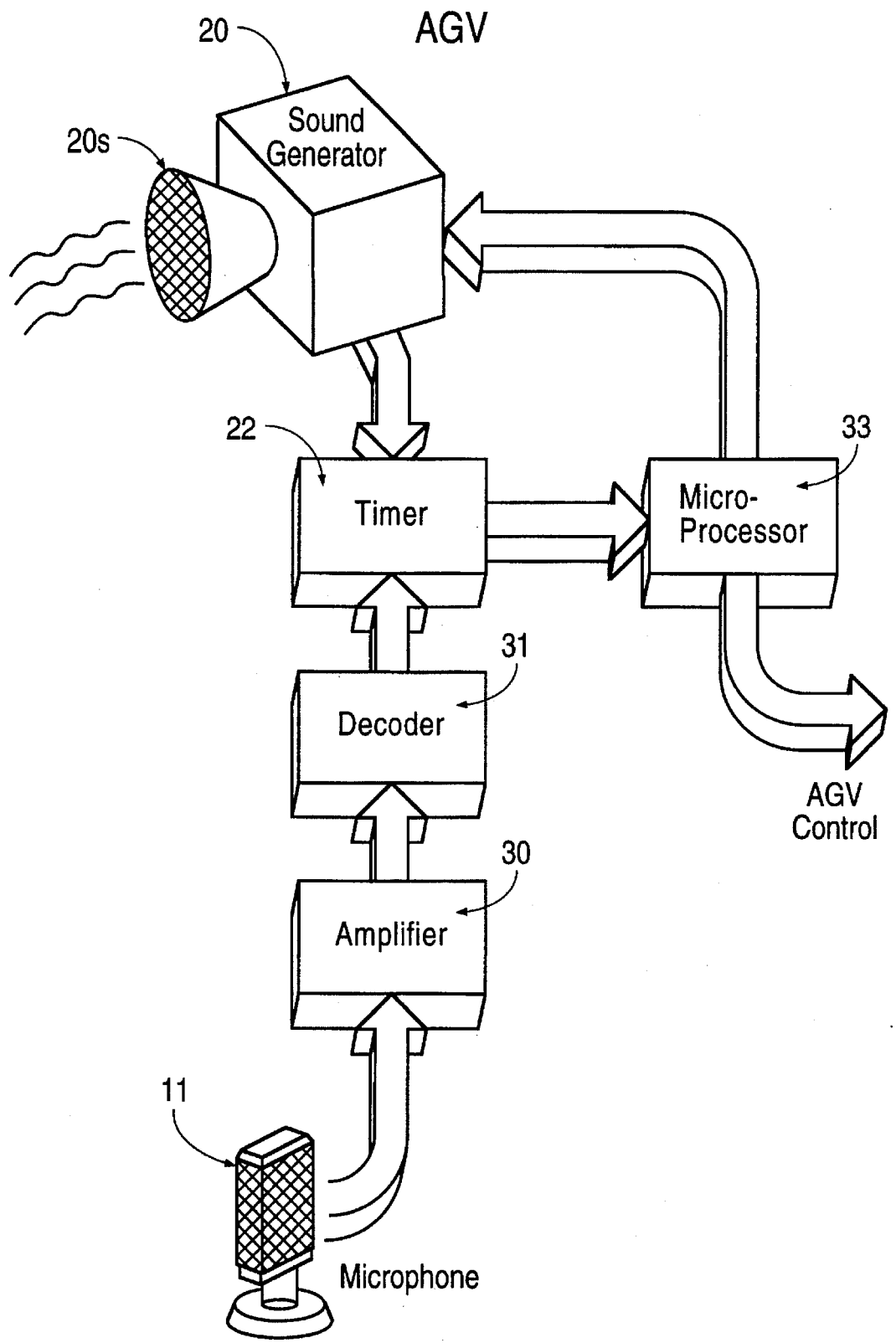
FIG. 6A is a block diagram showing the elements of an AGV in accordance with one embodiment of the present invention.

FIG. 6A shows a block diagram showing one embodiment of the present invention and FIG. 7A is a flow chart of the steps utilized in one embodiment of the present invention. In step 700 of the process of FIG. 7A, the AGV's microprocessor 33 in FIG. 6A triggers the sound generator 20 contained within the AGV 10. The sound generator 20 generates a high frequency audio signal which is then amplified and broadcast via speaker 20S into the AGV's workspace. At the same time that the sonic burst is broadcast, the AGV's timer 22 is started at step 702 of FIG. 7A. The sonic burst from the AGV is transmitted through the air to the various beacons located within reasonable sonic range.

Figure 6B:
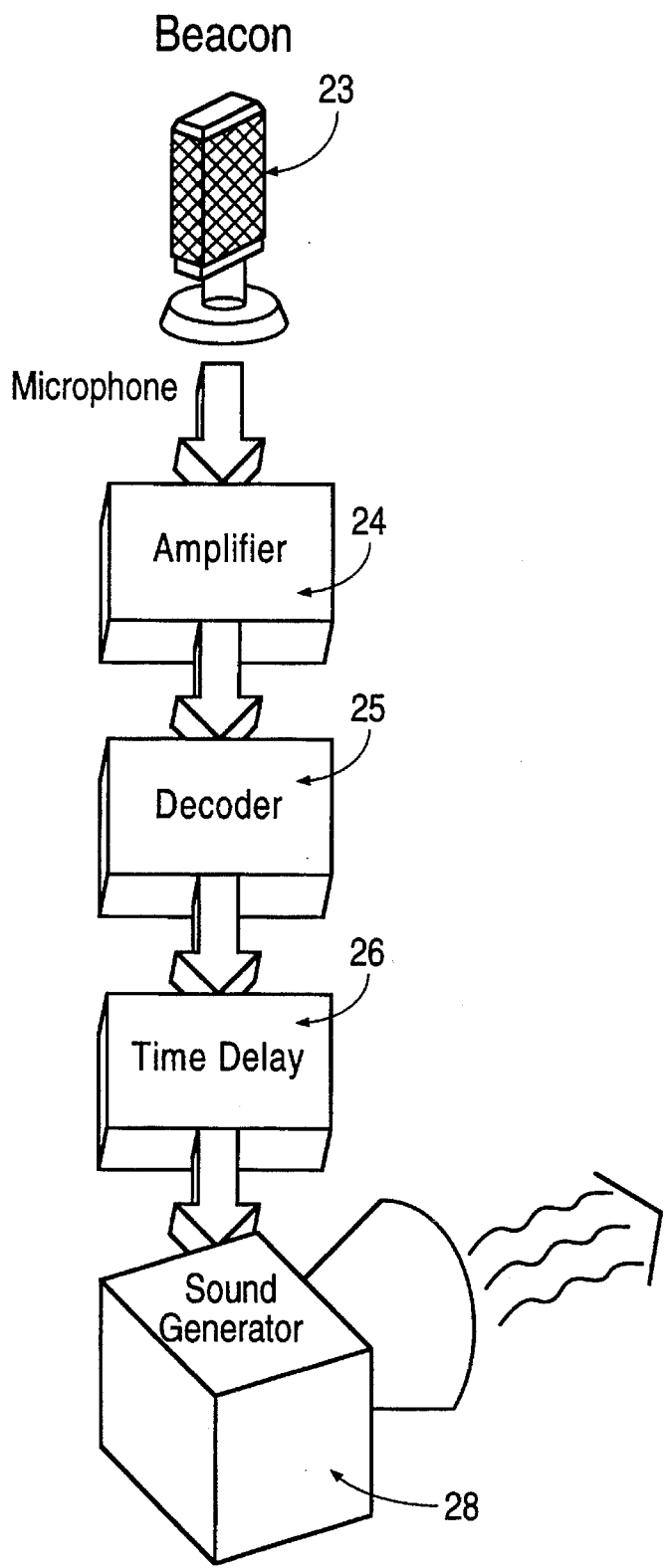
FIG. 6B is a block diagram showing the elements of a beacon in accordance with one embodiment of the present invention.

The operation of the beacons in this first embodiment is described with reference to FIGS. 6B and 7B. The beacon generally remains in a standby state as shown in step 750 of the process of FIG. 7B. In the standby state, the beacon monitors ambient sounds through the use of microphone 23 in FIG. 6B as indicated in step 752 of FIG. 7B. The sounds received by the beacon's microphone 23 are amplified by amplifier 24 and then decoded at step 754 of FIG. 7B. In this embodiment decoder 25 is comprised of a bandpass filter and a timer that looks for the signature of the AGV's broadcast in terms of frequency and pulse signature as shown in step 756 of FIG. 7B, and if a sonic burst of the appropriate frequency and pulse signature is detected, as indicated by decision branch 757A of FIG. 7B, the decoder 25 triggers the beacon's time delay circuit 26 at step 758 of FIG. 7B. Each beacon is equipped with a different delay time so that the AGV may identify the beacon broadcasting the sound burst.

As the AGV monitors sound waves in its workspace, it is important that the AGV be able to distinguish echoes of its own triggering sonic chirp from the sonic chirps of the responding beacons. Therefore, the delay between the triggering chirp and responding chirps of the beacons and the respective responding chirps must be sufficient to allow echoes of the preceding chirp to subside. In this first embodiment the time delay of a given beacon is an integer multiple of the time necessary for a sonic burst to travel the maximum expected range of the sonic burst. This maximum range is dependent on the amplitude of the emitted sound and for this example, the time delay increment is on the order of 75 milliseconds. Each beacon is assigned a different integer multiple of the delay increment. No beacon is assigned a zero multiple (i.e., no delay), as an immediate responding chirp from a beacon would be difficult to distinguish from an echo of the AGV's initiating sonic signal. Once the time delay provided by circuit 26 of the beacon expires (i.e., indicates that the predetermined number of time delay increments have passed), the beacon's sound generator 28 responds by transmitting a sonic burst similar to that initially broadcast by the AGV as shown at step 760 of FIG. 7B.

Referring again to FIGS. 6A and 7A, the sonic burst emitted by the beacon will be received by AGV 10 via microphone 11 at step 706 of FIG. 7A. This signal will then be amplified by amplifier 30 and then decoded by decoder 31 in a process similar to the beacon's standby state described above. Decoder 31 is similar to decoder 25 in FIG. 6B used in the beacons in that decoder 31 is a bandpass filter that looks for the signature of the beacon's sonic chirp broadcast in terms of frequency. If a sonic burst of the appropriate frequency is detected, the total elapsed time measured by the AGV's timer 22 is read by microprocessor 33 which is programmed to subtract the time delay for the appropriate beacon and the time required for decoder verification by the AGV's decoder 31. This occurs at step 710 of FIG. 7A. Beacons not responding within an allotted window of time at step 706 are assumed to be out of range and are ignored.

Since the time from the sending of the AGV's triggering chirp to receipt of the responding chirp of the beacon (with delay and processing time already compensated for) represents two-way travel time (i.e., from AGV to beacon and back to AGV), the time is divided by two to calculate one-way travel time for the sonic chirp at step 716 of FIG. 7A. The sonic travel time is then multiplied by the speed of sound appropriate for the environment of the AGV, taking into consideration, e.g., ambient temperature (note that the speed of sound through air is largely independent of air pressure and elevation above sea level) and relative humidity. For example, the speed of sound through air at a temperature of 20° C. is approximately 343.2 meters per second. Multiplying the sonic one-way travel time (in seconds) by the speed of sound (in meters per second) produces the distance between the AGV and the beacon (in meters). This is performed in step 718 of FIG. 7A. If the AGV has yet to receive sonic chirps from one or more beacons, referring to decision step 720 of FIG. 7A, the AGV returns to monitoring ambient sounds in its workspace at step 704 by way of branch 721A of FIG. 7A and repeats the process for the beacon with the next shortest associated delay time. Once the appropriate time delays for all beacons (plus one delay increment to rule out the registering of spurious echoes from the last sonic chirp) have expired, execution is directed along branch 721B of FIG. 7A to step 722 where the AGV's main computer determines the AGV's position from the measured distances in the manner described above.

In a second embodiment of the invention, the AGV's triggering sonic chirps and the beacon's responding chirps are transmitted at differing acoustic frequencies. This eliminates the above requirement of having to delay the first responding beacon because of potential confusion caused by echoes from the AGV's initiating pulse.

Figure 6C:
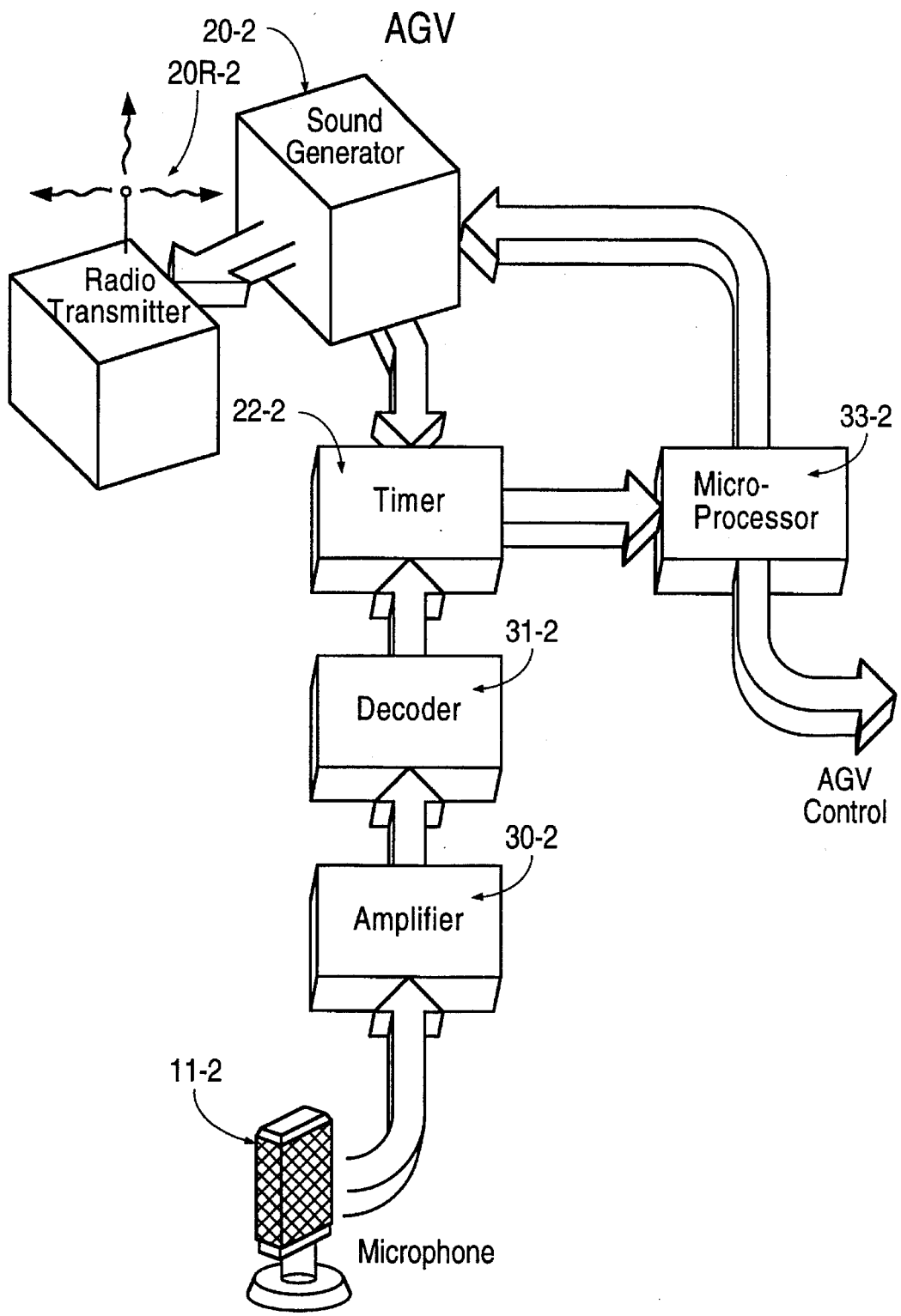
FIG. 6C is a block diagram showing the elements of an AGV in accordance with one embodiment of the present invention.
Figure 6D:
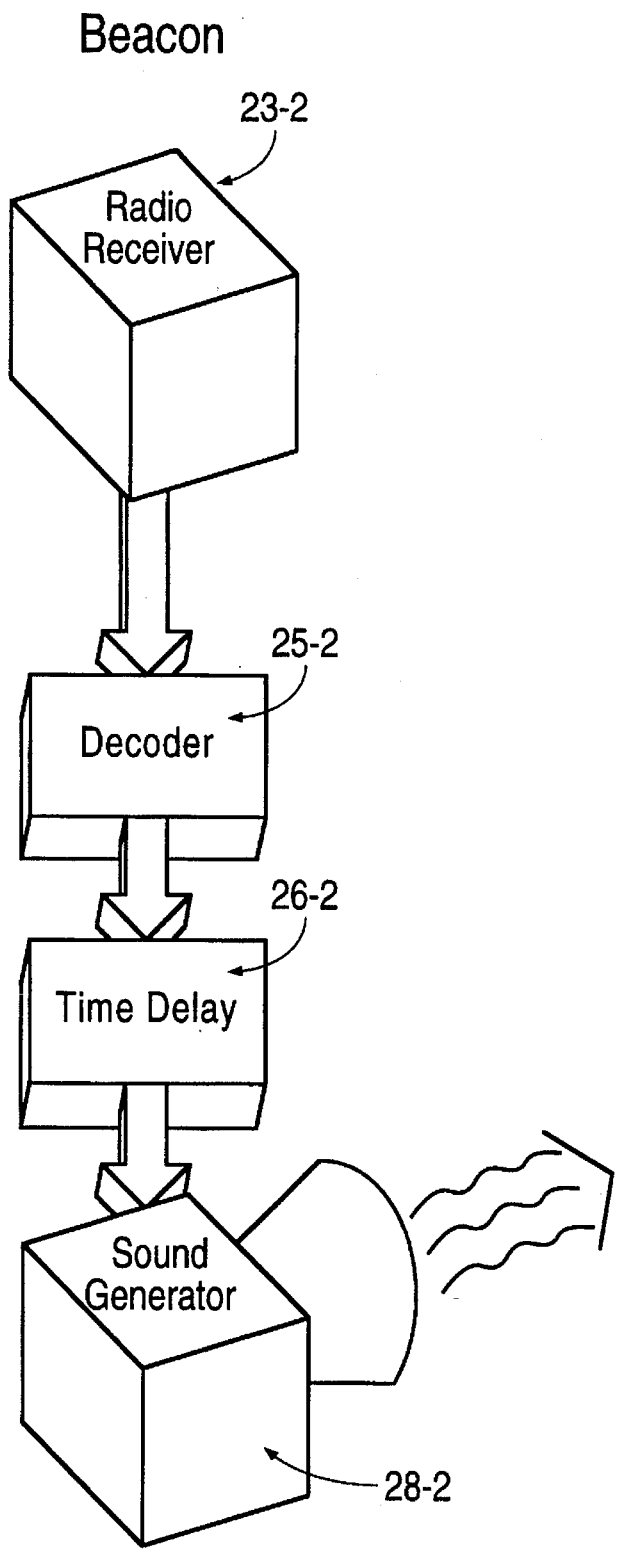
FIG. 6D is a block diagram showing the elements of a beacon in accordance with one embodiment of the present invention.

A third embodiment of the present invention will now be described with reference to FIGS. 6C, 6D, 7C and 7D. FIG. 7C is a logic flow diagram of the basic operation of an AGV in accordance with this third embodiment of the present invention. FIG. 6C represents the basic position determination circuitry of the AGV. As shown in FIG. 6C, the AGV's sound generator 20 of FIG. 6A is replaced with signal generator/encoder 20-2 and radio transmitter 20R-2 of FIG. 6C. Similarly, the beacon's microphone 23 in FIG. 6B is replaced with radio receiver 23-2 of FIG. 6D.

The position determination system of the third embodiment of the present invention operates in a manner similar to the first embodiment with two exceptions. First, there is no need to prohibit any beacon from having a zero delay as there is no concern for echoes of the triggering chirp being confused with responding chirps. Second, there is no need to divide the measured response time (with appropriate compensation for the delay period of the beacon and signal processing by both the beacon and the AGV) in half to determine one-way sonic travel time as the speed of radio frequency transmissions is sufficient to consider the trigger signal received simultaneously with transmission. Therefore, this third embodiment of the present invention determines position of the AGV more quickly than does the first or second embodiments.

With reference to FIG. 7C, FIG. 7D, FIG. 6C and FIG. 6D, the third embodiment is described in detail. In step 700-2 of the flow diagram of FIG. 7C, the AGV's microprocessor 33-2 of FIG. 6C triggers a signal generator 20-2 to generate a triggering radio signal at a predetermined frequency which is broadcast by a radio transmitter 20R-2 into the AGV's workspace. In step 702-2 of FIG. 7C, the timer 22-2 of FIG. 6C is started. The AGV then monitors the ambient sounds for beacon responses with microphone 11-2 during the standby mode of step 704-2.

Each beacon in this third embodiment is equipped with a radio receiver 23-2 which receives the transmitted radio signal from the AGV. As in the first embodiment, the beacons are generally in a standby state of step 750-2 until triggered by a signal detected from the AGV at step 752-2. All beacons will simultaneously receive the transmitted AGV radio signal. The decoder 25-2 of each beacon acts as a bandpass filter to pass the predetermined radio frequencies corresponding to AGV transmissions which occurs at step 754-2. The decoder then decodes the radio signal received in terms of its frequency and pulse signature at the decode signal step of 754-2. When the signature of a proper AGV signal is detected by the decoder 25-2 at step 756-2, the steps along decision branch 757a-2 are executed. At 758-2 a predetermined time delay is initiated by the time delay 26-2 for each beacon before the sound generator 28-2 responds with an acoustic chirp at step 760-2. The time delays are of such durations that echoes from preceding acoustic chirps will have long died out before the succeeding chirp is sounded.

The AGV receives successive beacon acoustic chirps in an order defined by the beacon time delays at step 706-2. The acoustic chirps received by the AGV's microphone 11-2 are amplified with amplifier 30-2 and then decoded by decoder 31-2 to detect the chirp frequency. Once an authentic beacon chirp is detected at step 706-2, the elapsed time indicated by the timer 22-2 at this time is noted at step 710-2 and sent to the microprocessor. Beacons not responding within an allotted window of time at step 706-2 are assumed to be out of range and are ignored. At step 712-2 the predetermined delay time for the present beacon chirp is determined on the basis of the number of chirps previously processed since the most recent initiating AGV radio transmission. At step 714-2 the microprocessor 33-2 subtracts the appropriate time delay and processing time from the elapsed time between the initiating AGV radio transmission and the receipt of the current beacon chirp to arrive at a time value representing the propagation time of sound from the current beacon to the AGV. The distance to the current beacon is then determined at step 718-2. At this step the microprocessor 33-2 multiplies the propagation time by the speed of sound to obtain the distance. The sequence of steps 704-2 through 718-2 is repeated with chirps received from each beacon. Step 720-2 determines when all beacons have responded based on the number of beacon chirps processed since the initiating radio transmission by the AGV. If some beacons have yet to respond, program flow proceeds along decision branch 721A-2 where the AGV is set in the standby mode at step 704-2 to await the next chirp. If all responding beacons have had their chirps processed, program flow proceeds along the decision branch 721B-2 to step 722-2 where the position of the AGV is calculated with respect to the beacon distances in the AGV main computer (not shown).

A fourth embodiment of the present invention is now described with reference to FIGS. 8A, 8B, 9A and 9B. As with the third embodiment, the AGV uses a signal generator/encoder 40 in FIG. 8A and a radio transmitter 41 in FIG. 8A in place of the sound generator 20 of FIG. 6A. Similarly, the beacons use a radio receiver 43 in FIG. 8B in place of microphone 13 of FIG. 6B.

The operation of the position determining system of the fourth embodiment of the present invention is now discussed with reference to FIGS. 9A and 9B. First, the AGV determines which beacons are to be polled (i.e., which beacons are to be triggered to generate a sonic chirp). The AGV then sequentially polls all selected beacons in step 902 of FIG. 9A as follows: At step 904 in FIG. 9A, the AGV encodes and broadcasts a triggering radio signal identifying the particular beacon to be polled. The AGV's microprocessor 33 of FIG. 8A causes the AGV's signal generator/encoder 40 to generate a signal at a predetermined frequency and to encode a digital signal by turning the generated signal on and off (as is done with ordinary garage door opener remote controls). The signal is then provided to radio transmitter 41 which adds the encoded signal to a carrier wave and transmits the carrier wave carrying the encoded signal, broadcasting throughout the workspace.

The beacons of the fourth embodiment operate as shown in the logic flow diagram of FIG. 9B. In step 950 of FIG. 9B, the beacon monitors radio frequency waves in the workspace with radio receiver 43 of FIG. 8B in a standby state similar to that described above in conjunction with FIG. 6B. When a radio signal of the appropriate carrier frequency is detected in step 952 of FIG. 9B, decoder 44 of FIG. 8B strips the carrier frequency from the signal in step 954 of FIG. 9B and decodes the digital signal in step 956 of FIG. 9B as is done with ordinary automatic garage door openers receiving signals from remote controls. The beacon then compares the decoded digital signal to the signal which identifies the given beacon. This is performed in step 958 of FIG. 9B. If a match is found as indicated in branch 960 of FIG. 9B, the beacon causes sound generator 46 of FIG. 8B to broadcast a sonic chirp as described above in conjunction with the first disclosed embodiment as shown in step 964 of FIG. 9B. If the digital code does not match that for the given beacon, branch 962 of FIG. 9B causes the beacon to return to monitoring the workspace for radio frequency transmissions in step 950 of FIG. 9B.

Figures 8A, 8B:
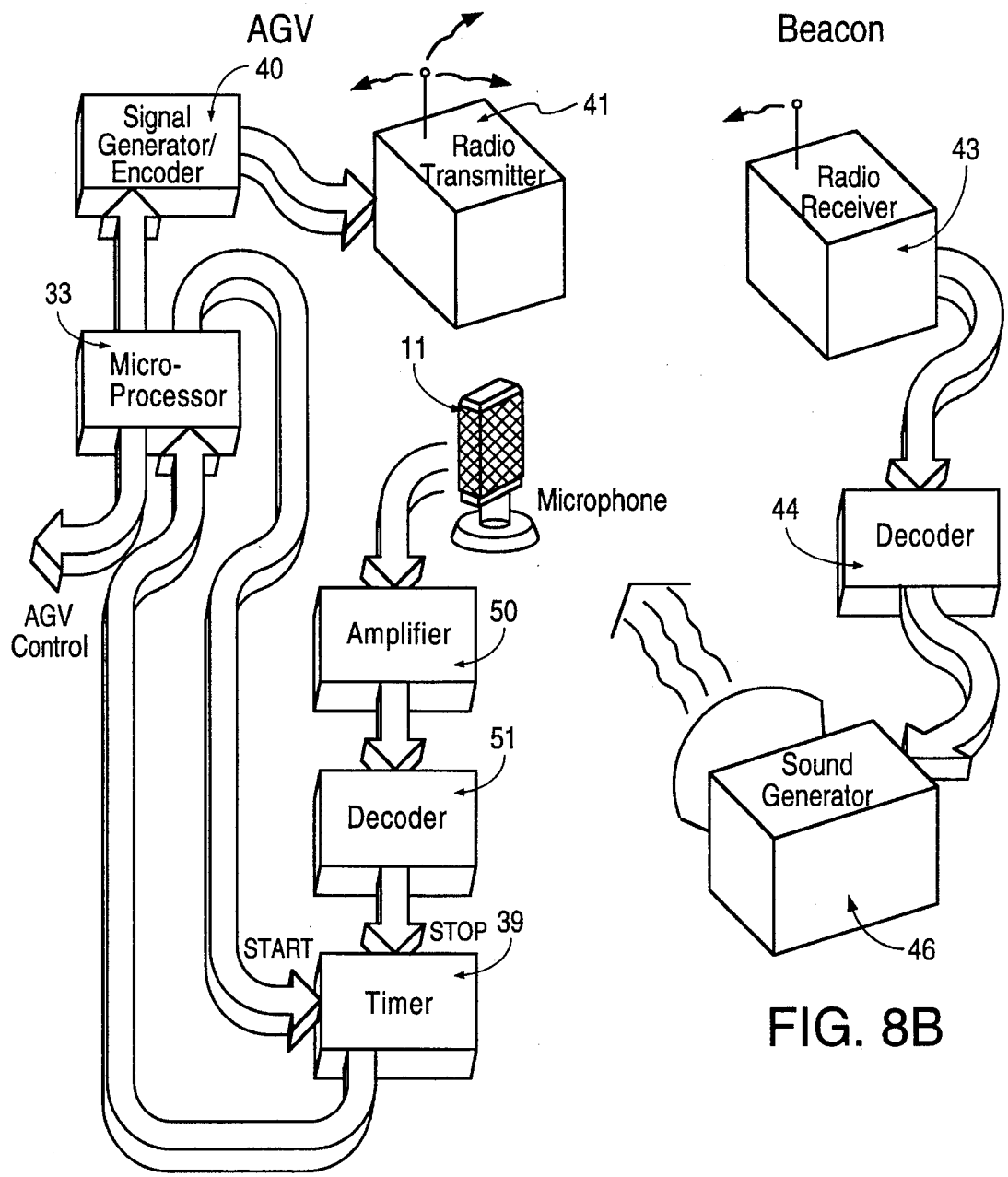
FIG. 8A is a block diagram showing the elements of an AGV in accordance with one embodiment of the present invention.
FIG. 8B is a block diagram showing the elements of a beacon in accordance with one embodiment of the present invention.

Immediately upon broadcasting the triggering radio signal in step 904 of FIG. 9A, the AGV initiates timer 39 of FIG. 8A at step 906 of FIG. 9A. The AGV then enters a standby state in step 908 of FIG. 9A in which the AGV monitors ambient sounds in the workspace through microphone 11 of FIG. 8A. As described above, with reference to FIGS. 6A and 7A, the AGV amplifies electrical signals corresponding to the sounds received by microphone 11 of FIG. 8A with amplifier 50 and passes the amplified signals through decoder 51 (essentially a bandpass filter and timer as described above with reference to the first embodiment) of FIG. 8A. Once an chirp signal code is detected in step 910 of FIG. 9A, timer 39 of FIG. 8A is examined to measure the amount of time that has elapsed between broadcasting of the radio frequency trigger signal and receipt of the sonic chirp, which occurs at step 912 of FIG. 9A. Subtracted from the measured time are the estimated time from the beacon's receipt of the radio frequency trigger signal to the beacon's broadcast of the sonic chirp and the time required by the AGV to amplify and decode the incoming sonic chirp, leaving a measurement of the one-way sonic travel time. As discussed above, the radio signal is assumed to be received simultaneously with its transmission. As described above for the first embodiment, the distance to the given beacon is calculated from the one-way sonic travel time at step 914 of FIG. 9A. The entire sequence is then repeated for the next selected beacon as indicated in step 916 of FIG. 9A. Once distance to each of the selected beacons is determined, those distances are transmitted to the main AGV computer (not shown) which then calculates the position of the AGV, according to the method described above with reference to FIGS. 2–4 and 5A–5D, in step 918 of FIG. 9A. Beacons not responding within an allotted window of time at step 910 are assumed to be out of range and are ignored.

In addition to those advantages described above by virtue of using a radio frequency triggering signal in the third embodiment of the present invention, this fourth embodiment of the present invention further reduces the time required for an AGV to determine position within a workspace by permitting the AGV to poll only those beacons necessary to determine position without unnecessary delay. For example, if an AGV in a building containing 10 beacons is known to be in a room containing only three beacons, the AGV is capable of quickly polling only those beacons located in the room without waiting for 10 full delay increments (during which all beacons would be expected to respond) to determine the AGV's position.

In a fifth and a sixth embodiment of the present invention, the AGV's radio transmitter 41 in FIG. 8A is replaced with a light source and focusing lens. Correspondingly, in place of a radio receiver 43 in FIG. 8B, each beacon has a photodetector. While any frequency of light would be suitable for the purposes described below, light in the infrared spectrum is preferred to avoid annoying human occupants of the AGV's workspace.

In the fifth embodiment of the present invention, light of the proper frequency is sent in all directions, triggering responding sonic chirps from each beacon in turn, each response separated by a predetermined delay increment in time. The operation of this embodiment is similar to that described above as the third embodiment replacing light transmission and photo detection for radio transmission and radio reception, respectively.

In a sixth embodiment, the photo trigger may be digitally encoded for identifying a particular beacon. Digital encoding of infrared photo light transmissions is accomplished as is done in ordinary television remote controls. Operation of this sixth embodiment is similar to that described above with respect to the fourth embodiment with the exception that radio transmissions and radio receptions are replaced with light transmissions and light receptions, respectively.

Using an encoded light signal in place of an encoded radio signal triggers only those beacons in the line of sight of the AGV (i.e., positioned such that no opaque object is positioned between the AGV and the particular beacon). Triggering only those beacons in the AGV's line of sight has the advantage of not triggering those beacons behind barriers where sonic reflections are likely, thus reducing errors due to mistaking reflections of sonic chirps for actual sonic chirps themselves. However, the corresponding disadvantage is that information derived from beacons located behind walls or barriers, through which sonic chirps travel freely, is lost.

Figures 10A, 10B:
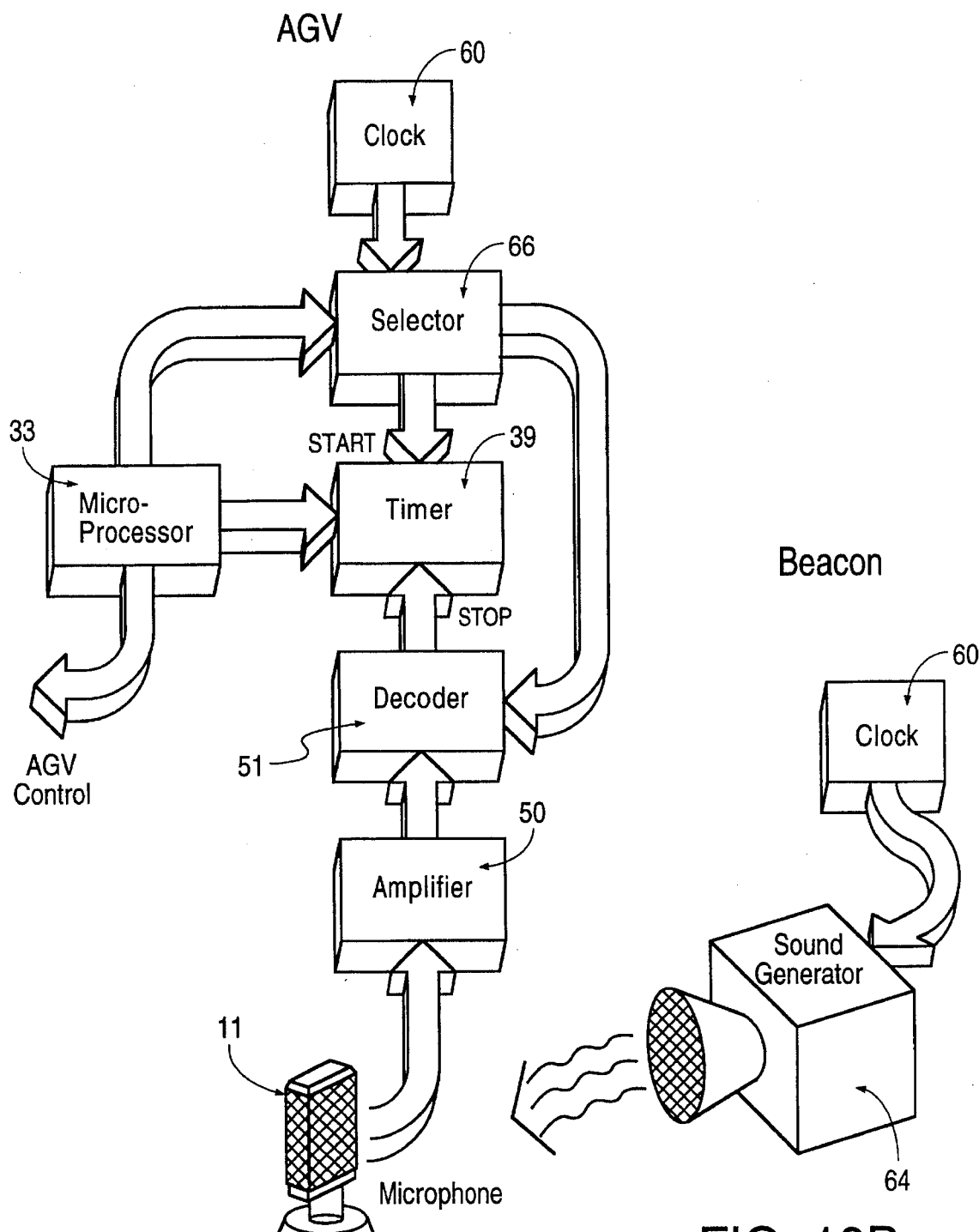
FIG. 10A is a block diagram showing the elements of an AGV in accordance with one embodiment of the present invention.
FIG. 10B is a block diagram showing the elements of a beacon in accordance with one embodiment of the present invention.
Figures 11A, 11B:
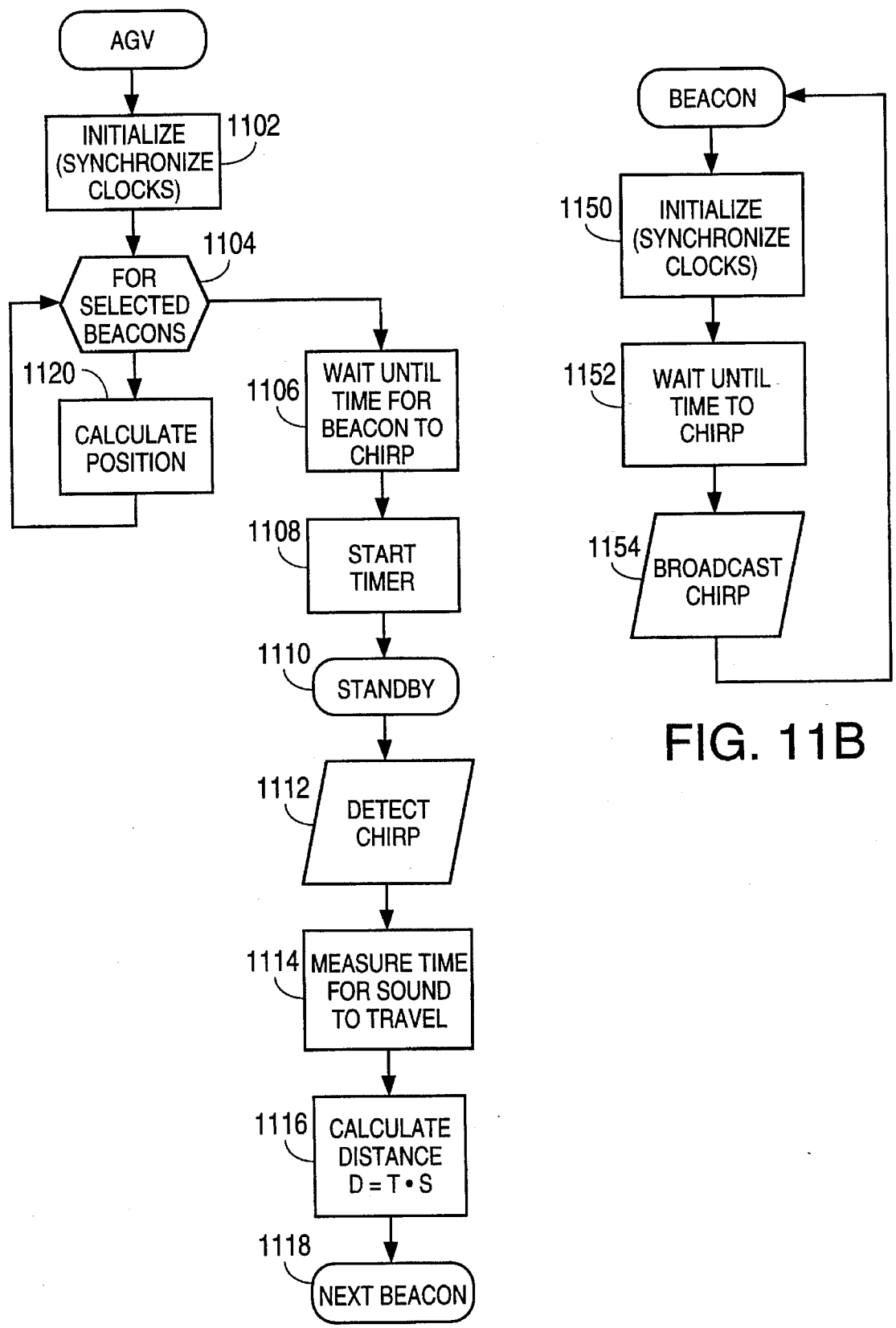
FIG. 11A is a flow diagram showing the operation of an AGV in accordance with one embodiment of the present invention.
FIG. 11B is a flow diagram showing the operation of a beacon in accordance with one embodiment of the present invention.

A seventh embodiment of the present invention is shown in FIGS. 10A and 10B and the logic flow diagrams of FIGS. 11A and 11B. As shown in FIGS. 10A and 10B, the AGV and the beacons are equipped with synchronized clocks 60 in FIGS. 10A and 10B. Before the system of the seventh embodiment of the present invention is implemented, the clocks of the beacons and the AGV must be synchronized. One way by which the clocks are synchronized is by connecting all clocks (i.e., the clocks of all beacons and the AGV) to a single clock initializing means.

The seventh embodiment of the present invention operates as follows. As described above, the beacon clock 60 in FIG. 10B is initialized in step 1150 in FIG. 11B. At a predetermined time designated for the given beacon to emit a sonic chirp at step 1152 in FIG. 11B, the clock causes sound generator 64 in FIG. 10B to broadcast a sonic chirp as indicated in step 1154 in FIG. 11B. Thus all beacons are continuously broadcasting sonic chirps in turn, each chirp separated by one time increment (time increments as described in conjunction with the first embodiment).

The operation of the AGV of FIG. 10A is shown in the logic flow diagram of FIG. 11A. The AGV's microprocessor 33 of FIG. 10A determines which beacons are to be polled to determine the AGV's position at step 1104 in FIG. 11A. For each selected beacon, the AGV's microprocessor 33 of FIG. 10A transmits data to the AGV's selector 66 identifying the beacon to be polled. Selector 66 then waits until clock 60 reaches the time designated for the appropriate beacon's next sounding of a sonic chirp at step 1106 in FIG. 11A. At that time, timer 39 in FIG. 10A is started, as indicated in step 1108 in FIG. 11A. Simultaneously, the beacon's sound generator 64 of FIG. 10B broadcasts a sonic chirp in step 1154 of FIG. 11B, by virtue of the synchronized clocks. The AGV then monitors sounds in the workspace through use of microphone 11 in FIG. 10A amplifying the received signals corresponding to the received sounds with amplifier 50 and passing these amplified signals through decoder 51 to detect sonic bursts of the appropriate frequency as indicated in steps 1110 and 1112 in FIG. 11A. Beacons not responding within an allotted window of time at step 1112 are assumed to be out of range and are ignored.

Data received from selector 66 in FIG. 10A at decoder 51 ensures that sonic chirps detected before the appropriate time for the next beacon to sound are not counted as a sonic chirp from the selected beacon. The time at which each beacon is designated to generate a sound follows the time designated for sonic chirp generation of the previous beacon by one time increment (i.e., the time that a sonic chirp would take to travel its expected range—e.g., 75 milliseconds).

Thus, if no chirp is received by the AGV before the next beacon is to chirp, it is assumed that the AGV is not in sonic range of the particular beacon whose distance is being measured by the AGV.

When a sonic chirp is detected, the elapsed time according to timer 39 then measures the one-way sonic travel time of the sonic chirp including the associated processing time. Microprocessor 33 subtracts delay due to amplifier 50 and decoder 51 to measure accurately the one-way sonic travel time in step 1114 of FIG. 11A. In the manner described above in conjunction with the first embodiment, the distance to the selected beacon is calculated from the one-way sonic travel time as shown in step 1116 of FIG. 11A. The procedure is then repeated for the next selected beacon as indicated in step 1118 in FIG. 11A. Once all selected beacons have been polled, microprocessor 33 of FIG. 10A transmits the distance information to the main AGV computer (not shown) and the AGV's position is calculated in the method described above with reference to FIGS. 2–4 and 5A–5D which happens at step 1120 in FIG. 11A.

In addition to those advantages described above with respect to the third and fourth embodiments of the present invention, this seventh embodiment is implemented without the requirement for radio transmitters and receivers or infrared light sources and photo detectors. However, this seventh embodiment of the present invention requires precisely synchronized clocks and means for precisely synchronizing the clocks. Such synchronization means can take many forms.

One method for clock synchronization would be an electrical clock synchronization pulse supplied to all clocks through temporary electrical connections between the AGV clock and each of the beacon clocks. The electrical connection could be removed during normal operation.

Another method for clock synchronization provides a periodic radio broadcast of a coded signal which would deactivate the AGV and beacons just long enough to synchronize all clocks with a coded synchronization radio signal. Immediately after synchronization, the system is reactivated. The radio signal clock synchronization can be incorporated as part of the power-up and initialization or system shutdown processes. During times when the AGV is stationary, or otherwise does not require an updated position determination, the beacons can be placed in a standby mode to conserve energy, which is important if the beacons are battery powered. At the resumption of AGV polling, the beacons can be reactivated and the clocks synchronized by radio signal.

Another variation on a clock synchronization means utilizes a common clock signal broadcast by a clock signal broadcasting means, which may be external to the beacons and the AGV. Such a clock signal broadcasting means broadcasts a single clock signal which is received by the AGV and all beacons as a common clock source. Since the AGV and beacons operate on the basis of this same clock signal, clock precision is not critical.

System control can be located external to the beacons and the AGV. Thus, each beacon is individually instructed to chirp at the appropriate time via radio transmission. The AGV receives this signal simultaneously, thus determining a reference time from which to calculate distance to the particular polled beacon. Alternatively, the AGV and external system control have synchronized clocks so that the predetermine sequence of beacon chirp events is anticipated by the AGV.

Referring back to FIG. 1, the positions of beacons 12a, 12b and 12c must be known to AGV 10 before AGV 10 can derive its position from the measured distances to beacons 12a, 12b and 12c. The positions of beacons 12a, 12b and 12c may be determined by any means. In one embodiment of the present invention, the position of each beacon 12a, 12b and 12c is entered into AGV 10 by a human operator. However, an alternative preferred method of determining the location of beacons 12a, 12b and 12c will now be described with reference to FIGS. 12A and 12B.

In this preferred method of beacon location determination, the distances between each beacon and its counterparts along with distances between each beacon and the AGV is determined by the following initialization process which involves individually interrogating each beacon about the distance to the other beacons.

Figure 12A:
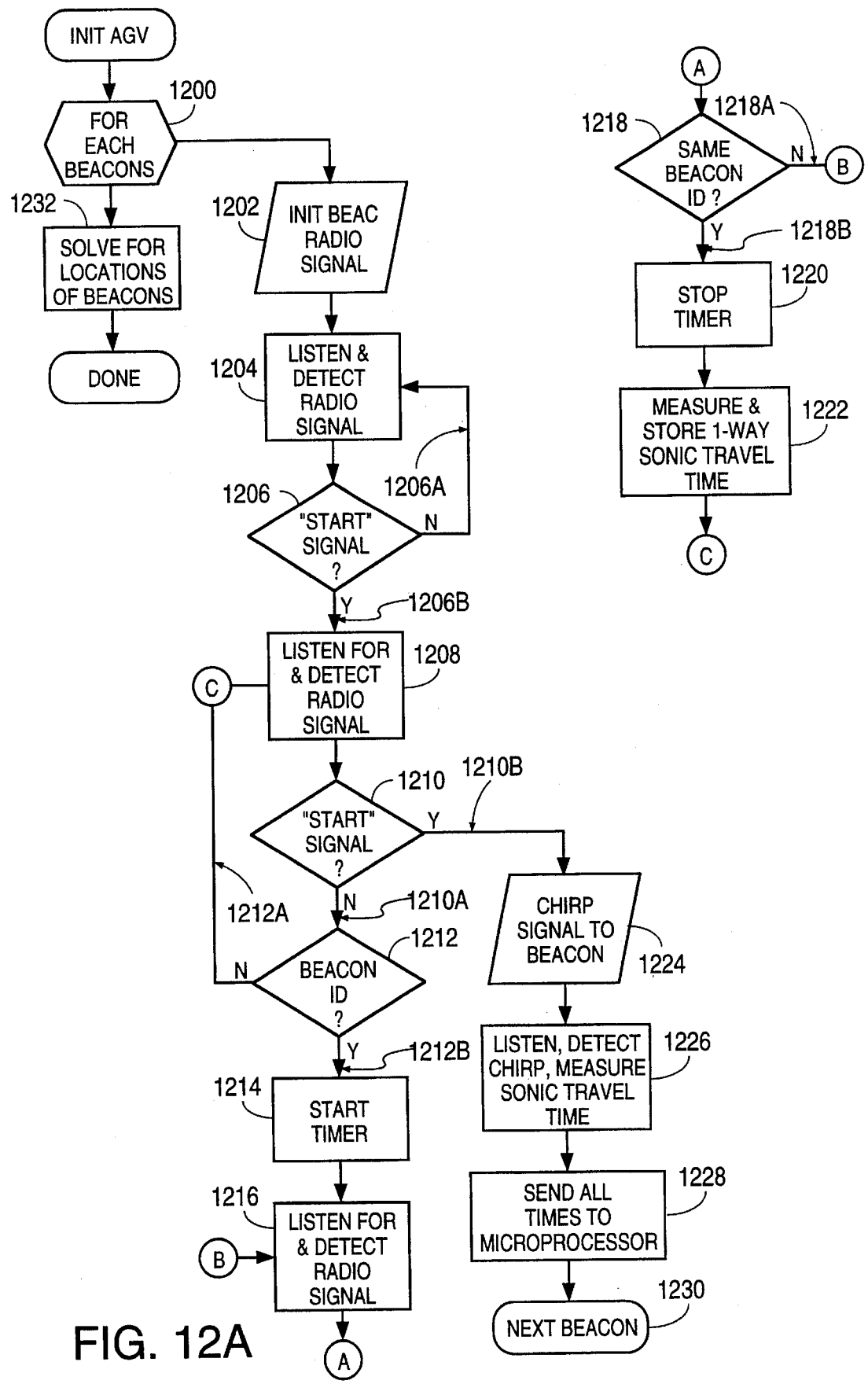
FIG. 12A is a flow diagram showing the operation of an AGV in one embodiment of a beacon position determination operation in accordance with the present invention.

AGV 10 initiates the beacon initialization process by requesting that each beacon in turn assumes the role of an AGV in determining its own position as shown by the logic flow diagram of FIG. 12A. The AGV requests beacon initialization of each beacon at step 1200 in FIG. 12A. An individual beacon is requested to perform position initialization by the AGV's broadcasting of a digitally encoded radio signal (as described above) identifying the beacon and indicating that the identified beacon is to perform position initialization as indicated in step 1202.

Figure 12B:
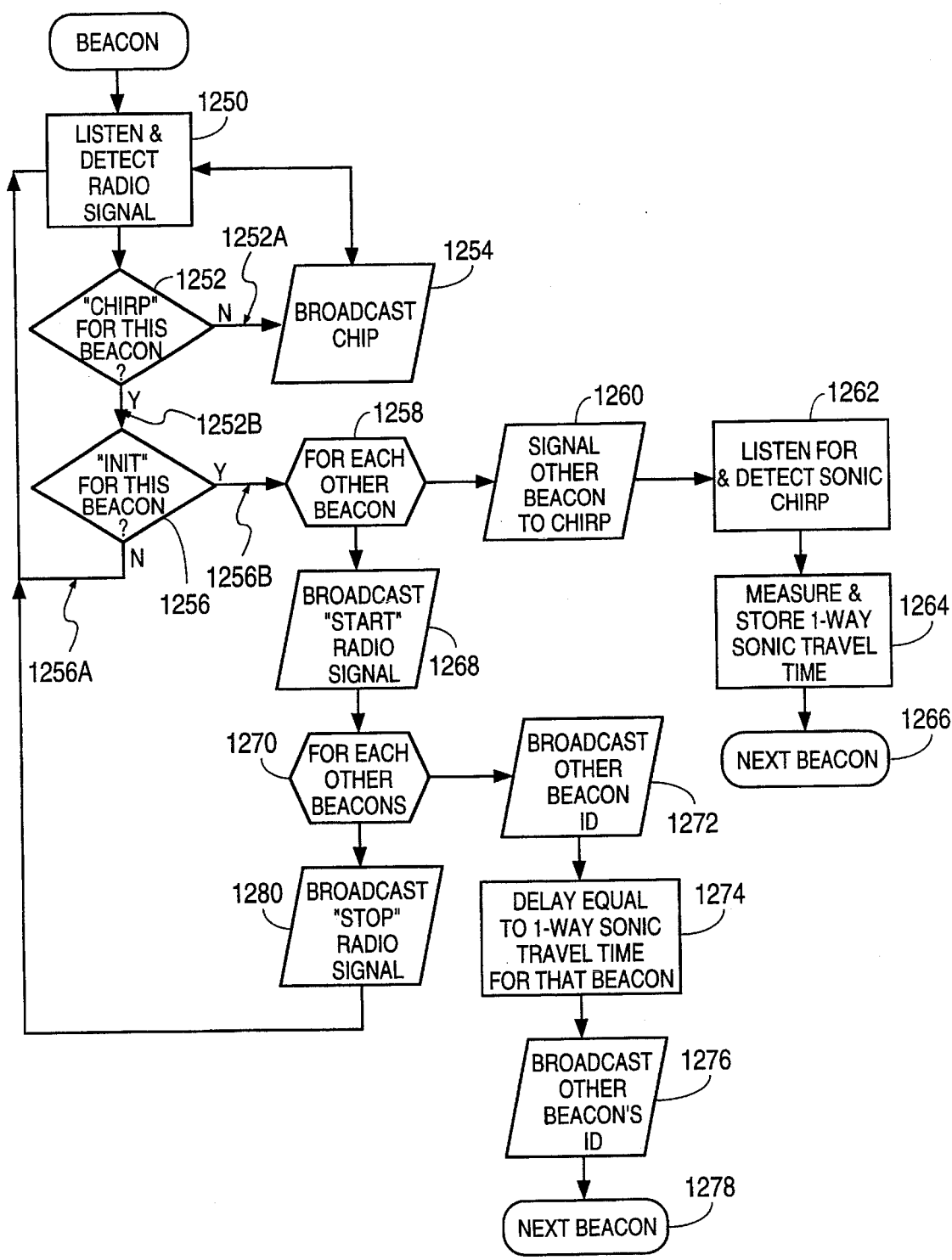
FIG. 12B is a flow diagram showing the operation of a beacon in one embodiment of a beacon position determination operation in accordance with the present invention.

The operation of the beacon of this embodiment is shown by the logic flow diagram of FIG. 12B. A first beacon (e.g., beacon 12a in FIG. 1) monitors radio frequencies in the workspace and detects encoded radio signals as described above with respect to the AGV's determination of position as indicated in step 1250 of FIG. 12B. The first beacon examines the received signal and compares it to the code for causing the first beacon to broadcast a sonic chirp at step 1252 of FIG. 12B. If the received code is the command for this first beacon to chirp, as indicated by branch 1252A, the first beacon will broadcast the sonic chirp at step 1254 and return to monitoring the workspace for radio signals at step 1250 in accordance with the usual AGV position determination procedure. Otherwise, according to branch 1252B, the first beacon compares the received digitally encoded signal with the signal which commands this first beacon to initialize its position as shown at decision step 1256. If the received digitally encoded signal is not an instruction for this first beacon to initialize its position as indicated at branch 1256A, the first beacon returns to monitoring the radio frequencies of the workspace at step 1250. Otherwise, as branch 1256B indicates, the first beacon follows the following procedure for each other beacon at loop 1258 (in this example, the procedure is executed for beacons 12b and 12c of FIG. 1).

A second beacon (e.g., beacon 12b in FIG. 1) is signaled to broadcast a sonic chirp by the first beacon's (e.g., in this example beacon 12a) broadcasting of a properly encoded radio signal which occurs at step 1260 of FIG. 12B. The radio signal is encoded as described above in conjunction with the fourth embodiment to signal the second beacon to broadcast a sonic chirp. The first beacon (e.g., beacon 12a in FIG. 1) then initializes the first beacon's timer and monitors the workspace for sonic chirps as shown in step 1262 of FIG. 12B. Once a chirp is detected, the first beacon measures and stores the one-way sonic travel time between the second beacon (e.g., beacon 12b) and the first beacon (e.g., beacon 12a) as shown in step 1264. The procedure is then repeated for any remaining beacons (e.g., beacon 12c) as indicated in step 1266 in FIG. 12B.

Next, the first beacon relays information regarding the respective distances between the first beacon and the other beacons (in this example, the distance between beacons 12a and 12b and the distance between beacons 12a and 12c). The first beacon broadcasts a digitally encoded radio signal which is recognized by the AGV as an instruction for the AGV to begin receipt of the distance information, which is indicated in step 1268 at FIG. 12B. Then for each beacon for which the first beacon has acquired distance information, referring to step 1270 of FIG. 12B, the first beacon will broadcast a digitally encoded radio signal identifying the second beacon for which distance information is to be relayed (e.g., beacon 12b) at step 1272. The first beacon then delays an amount of time equal to the one-way sonic travel time between the first beacon and the beacon identified by the encoded radio signal at step 1274. At step 1276 the initiating beacon then rebroadcasts the digitally encoded radio signal identifying the beacon for which the distance information (the corresponding time delay) has just been relayed. The procedure is repeated for remaining beacons as indicated by step 1278. At step 1280 the initiating beacon terminates the transmission of distance information by broadcasting a digitally encoded radio signal informing the AGV that the distance information for all the actively responding beacons has been transmitted.

Once the AGV broadcasts the digitally encoded radio signal instructing a beacon to execute the position initialization process at step 1202 in FIG. 12a, the AGV will monitor radio frequencies in the workspace and detect radio signals as indicated in step 1204. Once a digitally encoded signal is received, the AGV compares the received signal to the digital signal instructing the AGV to begin receipt of distance information from the initializing beacon according to decision step 1206. If the received signal is not an instruction to the AGV to begin receipt of distance information, execution follows branch 1206A and the AGV returns to monitoring radio frequencies in the workspace at step 1204. However, if the received encoded digital signal does in fact match the signal for instructing the AGV to begin receiving distance information, execution will follow branch 1206B, and the AGV then monitors radio frequencies in the workspace to detect the next digitally encoded radio signal at step 1208. The next received signal is then compared to a signal instructing the AGV to terminate the receipt of distance information at decision step 1210. If the received signal is not such a command, then according to branch 1210A, the received signal is compared to the respective beacon identification signals at decision step 1212. If the received signal does not identify a beacon, then, as indicated by branch 1212A, the AGV returns to monitoring the radio frequencies in the workspace at step 1208. Otherwise, as indicated by branch 1212B, the AGV starts its internal timer at step 1214 and monitors radio frequencies in the workspace to detect the next radio signal at step 1216. The received radio signal is then compared to the last received beacon identification signal at decision step 1218. If the latter received signal does not match the previously received beacon identification signal, then in accordance with branch 1218A, the AGV returns to monitoring the radio frequencies of the workspace at step 1216. Otherwise, according to branch 1218B, the AGV's internal timer is stopped at step 1220 and the time between radio signals is measured and stored as the one-way sonic travel time between the initializing beacon and the beacon identified by the received radio signal, as indicated at step 1222. The AGV then returns to monitoring radio frequencies in the workspace and detecting radio signals at step 1208.

Referring to decision step 1210 and branch 1210B, when a digitally encoded radio signal instructs the AGV to terminate receipt of distance information, the AGV then determines the distance between the initiating beacon and the AGV in the process described above in conjunction with the fourth embodiment. The AGV broadcasts a digitally encoded radio signal instructing the beacon to broadcast a sonic chirp at step 1224. Next the AGV monitors the workspace for sonic chirps and measures the time taken by the sonic chirp to travel from the beacon to the AGV as described above at step 1226. At this point in the process, the AGV has distance information for the respective distances between the first beacon and all other beacons and between the first beacon and the AGV. This information is then stored in the AGV's internal microprocessor in step 1228. The initiating process is then repeated for the remaining beacons as indicated in step 1230. Each beacon, in turn, determines distances to its colleagues and to the AGV in the same manner, then transmits this data to the AGV.

Finally, the AGV uses the distance information obtained to determine the relative positions of the respective beacons at step 1232. The AGV has sufficient information to treat each beacon as if it were an AGV determining its position using the remaining beacons and the AGV as positioning beacons (e.g., beacons 12a, 12b and 12c in FIG. 1). For example, the x and y coordinates $(x_1,y_1)$ of the position of beacon 12a in FIG. 1 can be expressed in terms of the x and y coordinates $(x_2,y_2)$, $(x_3,y_3)$ respectively, of beacons 12b and 12c and the x and y coordinates $(x_{AGV},y_{AGV})$ of the AGV and the measured respective distances $d_{12}$, $d_{13}$, and $d_1$ to beacons 12b and 12c and to the AGV.

Figure 14:
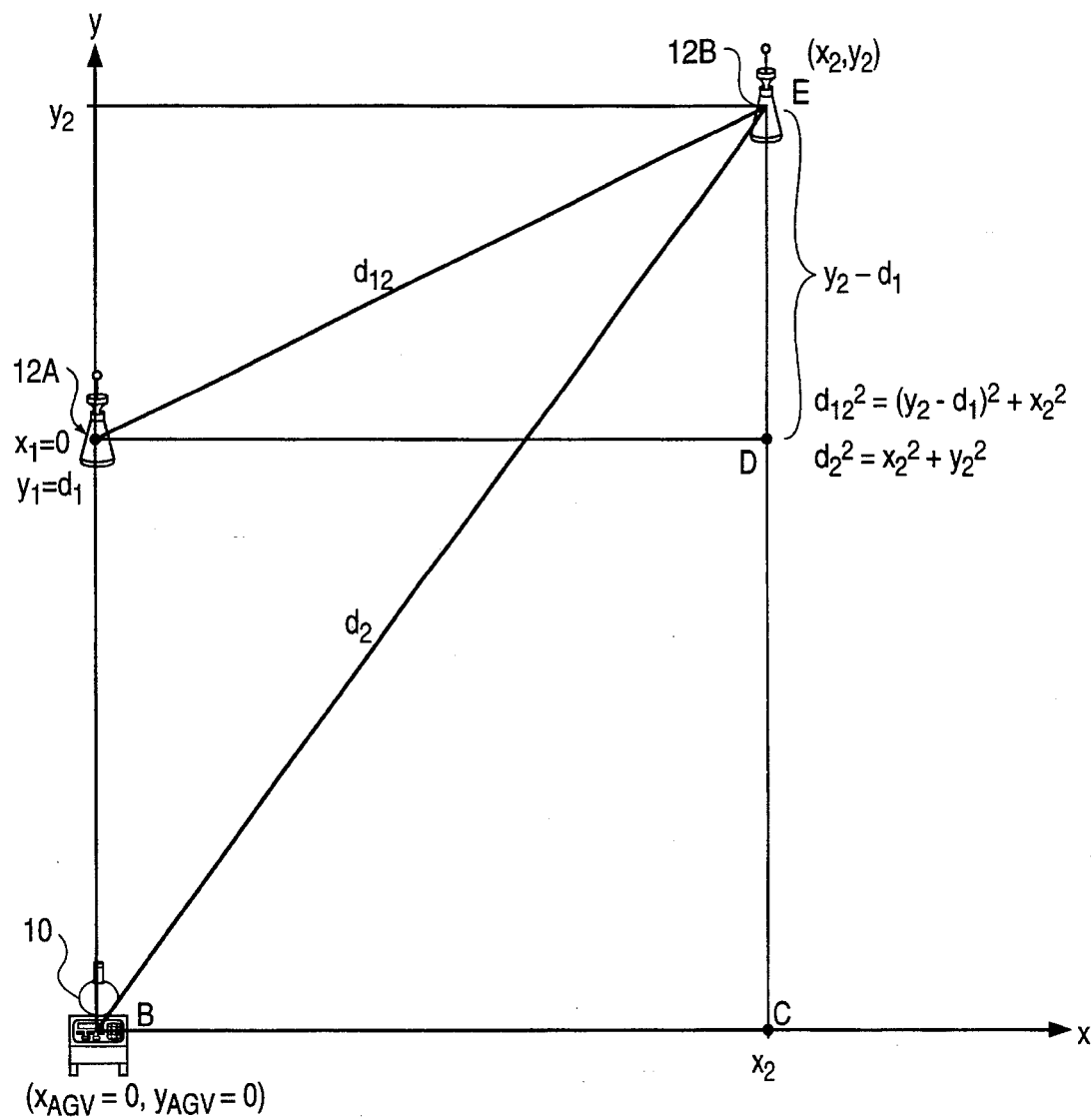
FIG. 14 is a diagram showing beacon position determination from inter-beacon distances and beacon AGV distances in accordance with one embodiment of the present invention.

As shown in FIG. 14, a Cartesian coordinate system can be imposed upon the workspace by arbitrarily assigning the AGV the position (0,0) (point B) and by arbitrarily placing a first beacon at a point A on one axis (e.g., beacon 12a is placed on the Y-axis by setting its "x" coordinate equal to 0, i.e., setting the position of beacon 12a to $(0,d_1)$). The y coordinate of the first beacon would then be the distance measured between first beacon 12a to the AGV, namely, $d_1$. The position of a second beacon 12b is at point B with unknown coordinates $(x_2,y_2)$, which can then be determined from the known (arbitrarily assigned) positions of the AGV 10 and the first beacon and the measured distance $d_{12}$ between the second beacon and the first beacon and the measured distance $d_2$ between the second beacon and the AGV. As previously discussed, knowing two fixed positions and distances to those two fixed positions yields two possible solutions. As shown in FIG. 14, triangles ADE and BCE are both right triangles. Invoking the Pythagorean relation yields the equations:

$$d_1^2 = x_2^2 + (y_2 - d_1)^2; \quad d_2^2 = x_2^2 + y_2^2$$

These equations may be solved for $x_2$ and $y_2$ to obtain:

$$x_2 = \pm d_2 \sqrt{1 - \frac{d_2^2}{4d_1^2}} \quad ; y_2 = \frac{d_2^2}{2d_1}$$

As each solution:

$$\left( +d_2 \sqrt{1 - \frac{d_2^2}{4d_1^2}}, \frac{d_2^2}{2d_1} \right) \text{ and } \left( -d_2 \sqrt{1 - \frac{d_2^2}{4d_1^2}}, \frac{d_2^2}{2d_1} \right)$$

is equally valid in the imposed Cartesian coordinate system, one of the two possible solutions is arbitrarily selected as correct. Once the coordinates of three objects are known (e.g. the AGV, the first beacon and the second beacon), the distance information obtained by the method described above in conjunction with FIGS. 12A and 12B may be used to calculate the positions of the remaining beacons. The position $x_i, y_i$ of any beacon i can now be unambiguously determined from the known positions of the AGV 10, beacons 12a and 12b, and their distances to beacon i in a manner similar to that described above with reference to FIGS. 3 and 5.

Thus a solution may be readily obtained and the locations of beacons 12a, 12b and 12c in terms of the Cartesian coordinates imposed upon the workspace are then stored within the AGV for use in later determining AGV's position.

Figure 15:
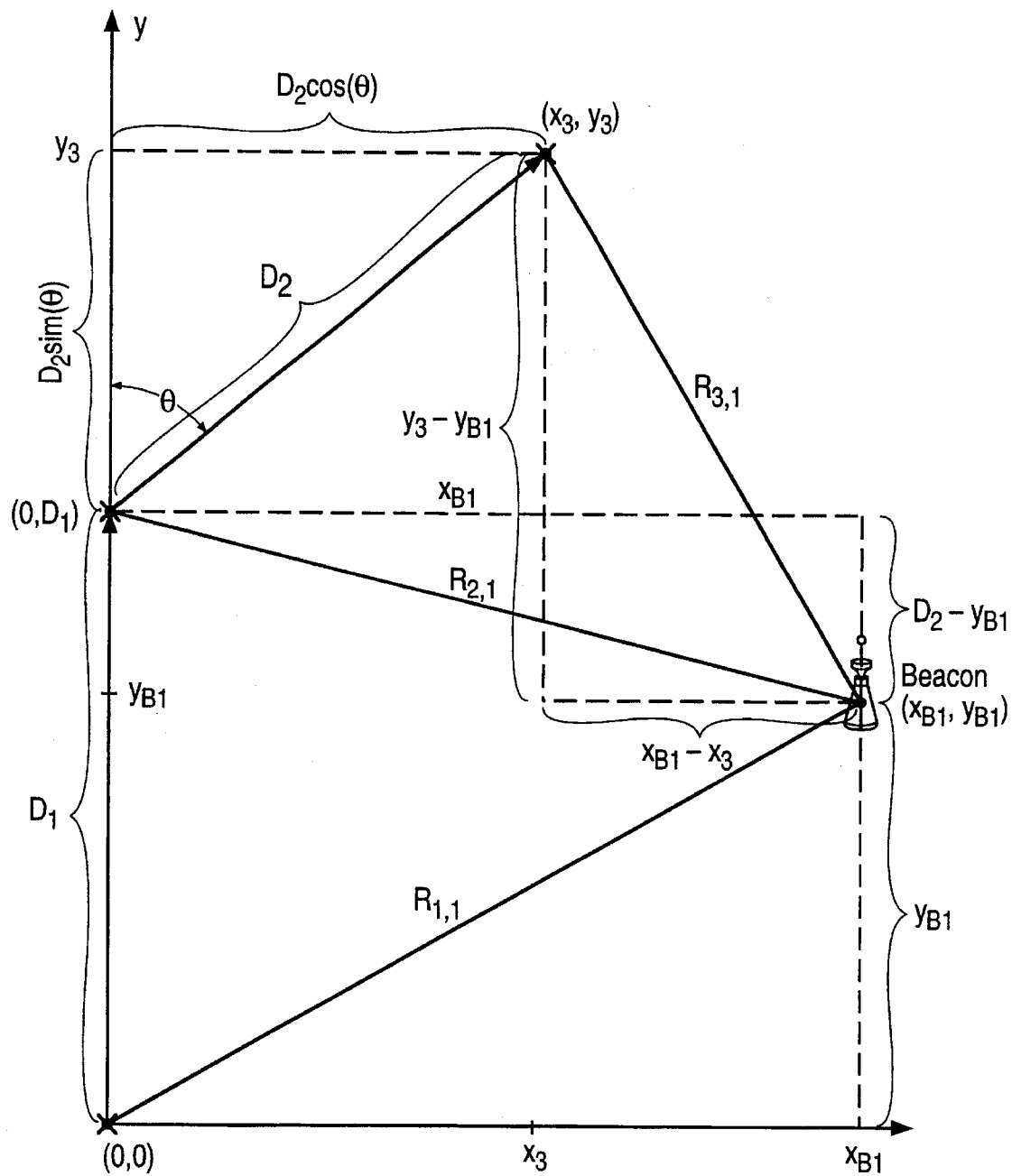
FIG. 15 is a diagram showing beacon position determination from beacon AGV distances taken at three AGV locations.

In accordance with an eighth embodiment of the invention a method of locating the beacons 12a, 12b and 12c of FIG. 1, requires only the distance readings from the AGV to the beacons taken from at least three AGV locations, wherein the second and third locations are determined by dead reckoning predetermined displacements from the first location. Since only two dead reckoning operations are performed, the accumulated errors will be small. As shown in FIG. 15, the first location is assigned coordinates $(x,y)=(0, 0)$. The distances $R_{1,1}$, $R_{1,2}$ and $R_{1,3}$ from the first location to a first beacon at $(x_{B1}, y_{B1})$ are determined by chirp travel times as in the previous embodiments. By dead reckoning, the AGV moves a first predetermined distance $D_1$ in a straight line along an arbitrary direction chosen to be an x or a y coordinate axis, the y axis in this case, so that the second location has coordinates $(0, D_1)$. The distances $R_{2,1}$, $R_{2,2}$ and $R_{2,3}$ from the first beacon at $(x_{B1}, y_{B1})$ to this second location are also determined by chirp travel times. By dead reckoning, the AGV rotates at a predetermined angle $\Theta$ with respect to the line connecting the first and second locations (y axis), and travels a second predetermined $D_2$ distance to a third position $(x_3, y_3)$, where $x_3 = D_2\cos(\Theta)$ and $y_3 = D_2\sin(\Theta) + D_1$. The beacon distances to the third location are determined by chirp travel times. A first beacon is shown to have unknown coordinates $(x_{B1}, y_{B1})$. Using the Pythagorean Theorem leads to the equations:

$$x_{B1}^2 + y_{B1}^2 = R_{1,1}^2$$

$$x_{B1}^2 + (D_1 - y_{B1})^2 = R_{2,1}^2$$

$$(x_3 - x_{B1})^2 + (y_3 - y_{B1})^2 = R_{3,1}^2$$

The first beacon coordinates can now be obtained:

$$y_{B1} = \frac{x_3(R_{1,1}^2 - R_{2,1}^2 + D_1^2)}{2x_3 D_1}$$

and $$x_1 = \sqrt{{}_{1,1} - y_1} \, ,$$

where $x_3 = D_2\cos(\Theta)$ and $y_3 = D_2\sin(\Theta) + D_1$. The second and third beacon coordinates are obtained in the same manner as the first. These equations can be extended to a three dimensional workspace.

Since the above method of beacon location requires that readings be taken from at least three separate known locations, three receivers of known relative orientation can be mounted directly on the AGV if the AGV itself encloses a substantial area or the workspace allows the mounting of such receivers on the AGV. For this case, no dead reckoning is required, since the spatial extent of the receiver locations allows accurate beacon location. The beacons/receiver distance from each receiver can be used in the above equations to determine beacon locations.

A variation on the above mounted receiver method involves two receivers separated by a known distance on a rigid mount which is rotated at a known angle after a translation by a known distance to provide added receiver locations. It is preferred that the angle of rotation be close to 90 degrees to more accurately map the beacon positions.

Beacons which are out of range of the initialization process will be mapped when needed. As the AGV comes into the range of an unmapped beacon, the unmapped beacon is located by the two beacon position locating methods described above.

The synchronized clock embodiment can easily be adapted to a multiple AGV workspace. Assuming the clock of each AGV is synchronized with each of the beacons, each AGV can operate independently within the system. Each AGV simultaneously receives the scheduled chirp from a given beacon and independently computes its location.

Dead reckoning is provided in the AGV as a reality check, to rule out possible errors due to beacon echoes, or other sources of bad data. A program in the AGV compares the input data from each beacon against the positional data derived by the AGV's dead reckoning system. If the data doesn't match an acceptance criterion, it is rejected or held for confirmation.

A sonic positioning system and method has been disclosed which provides fast and accurate position determination for automatically guided vehicles within a workspace. The system is characterized by its compactness and simplicity and can therefore be utilized in small household robots.

A logical extension of this same basic idea is to have the vehicle emit a sonic signal and the beacons act as receivers. The math and hardware would be similar but the vehicle would be simpler. The beacons could be tied to a central computer used to determine the location of the AGV and said information transmitted to the robot.

While the present invention is illustrated with particular embodiments, it includes all equivalent variations and modifications of the disclosed embodiments falling within the scope of the appended claims.

I claim:

1. A system for determining the position of an object within a gas-filled space, said system comprising:

one or more beacons placed at positions throughout said space, each of said beacons including sound generating means for emitting sound into said space;

wherein said object comprises:

means for determining the positions of said one or more beacons;

means for determining the distance between each of said one or more beacons and said object, said means for determining the distance comprising:

means for measuring the time required for a sound generated by one of said beacons to reach said object; and means for converting said measured time to a distance; and means for determining from said distances the position of said object within said space.

2. The system of claim 1 wherein said means for measuring time comprises:

means for causing one of said one or more beacons to generate a sound at a time known to said object;

means for detecting said sound generated by said beacon; and means for measuring the time elapsing between the generation of the sound by said beacon and the receipt of said sound by said object.

3. The system of claim 2 wherein said object further comprises means for generating a sound;

further wherein each of said one or more beacons further comprises means for detecting said sound generated by said object;

further wherein said means for causing said one or more beacons to each generate a sound comprises:
said sound generation means of said object; and
said sound detection means of said beacons.

4. The system of claim 2 wherein said object further comprises means for transmitting a radio frequency signal and wherein each of said one or more beacons further comprises means for receiving said radio frequency signal generated by said object and means for generating a sound in response to receipt of said radio frequency signal.

5. The system according to any of claims 1, 2 or 4 wherein said sound generated by said one or more beacons is ultrasonic.

6. The system of claim 3, wherein said sound generated by said one or more beacons and said object is ultrasonic.

7. The system according to any of claims 1, 2, or 4, wherein said sound generated by said one or more beacons is broadcast at one or more frequencies.

8. The system according to claim 5, wherein said sound generated by said one or more beacons is broadcast at one or more frequencies.

9. The system according to any of claim 3 or 6, wherein said sound generated by said one or more beacons and said object are broadcast at one or more frequencies.

10. The system according to any of claims 1, 2, or 4, wherein said sound generated by each of said one or more beacons is broadcast at a plurality of frequencies.

11. The system according claim 5, wherein said sound generated by each of said one or more beacons is broadcast at a plurality of frequencies.

12. The system according claim 7, wherein said sound generated by each of said one or more beacons is broadcast at a plurality of frequencies.

13. The system according to claim 6, wherein said sound generated by each of said one or more beacons and said device is broadcast at a plurality of frequencies.

14. The system according to claim 9, wherein said sound generated by each of said one or more beacons and said device is broadcast at a plurality of frequencies.

15. A system according to claim 1, wherein said system comprises at least three beacons, and wherein at least one of said beacons is positioned such that it is not located along a line extending between any two other beacons.

16. The system of claim 15, wherein said beacons include sound generating means for emitting sound into said space, and wherein said means for determining the distance between said object and each said beacon comprises:
means for measuring the time required for a sound generated by one of said beacons to reach said object; and
means for converting said measured time to a distance.

17. The system of claim 16 wherein said means for measuring time comprises:
means for causing one of said one or more beacons to generate a sound at a time known to said object;
means for detecting said sound generated by said beacon; and
means for measuring the time elapsing between the generation of the sound by said beacon and the receipt of said sound by said object.

18. The system of claim 17 wherein said object further comprises means for generating a sound;
further wherein each of said one or more beacons further comprises means for detecting said sound generated by said object;

further wherein said means for causing said one or more beacons to each generate a sound comprises:
said sound generation means of said object; and
said sound detection means of said beacons.

19. The system of claim 17 wherein said object further comprises means for transmitting a radio frequency signal and wherein each of said one or more beacons further comprises means for receiving said radio frequency signal generated by said object and means for generating a sound in response to receipt of said radio frequency signal.

20. The system according to any of claims 16, 17 or 19 wherein said sound generated by said one or more beacons is ultrasonic.

21. The system of claim 18, wherein said sound generated by said one or more beacons and said object is ultrasonic.

22. The system according to any of claims 16, 17, or 19, wherein said sound generated by said one or more beacons is broadcast at one or more frequencies.

23. The system according to claim 20, wherein said sound generated by said one or more beacons is broadcast at one or more frequencies.

24. The system according to any of claims 18 or 21, wherein said sound generated by said one or more beacons and said object are broadcast at one or more frequencies.

25. The system according to any of claims 16, 17, or 19, wherein said sound generated by each of said one or more beacons is broadcast at a plurality of frequencies.

26. The system according to claim 20, wherein said sound generated by each of said one or more beacons is broadcast at a plurality of frequencies.

27. The system according to claim 22, wherein said sound generated by each of said one or more beacons is broadcast at a plurality of frequencies.

28. The system according to claim 21, wherein said sound generated by each of said one or more beacons and said device is broadcast at a plurality of frequencies.

29. A method for determining an object position for an object within a gas-filled space in which one or more beacons have been placed, each beacon having a beacon position, said method comprising the steps of:
storing within said object information regarding the position of said one or more beacons;
causing one or more of said beacons to generate a sound;
measuring a sonic travel time required for each said sound to travel from each said beacon to said object;
calculating from said sonic travel time the distance between each said beacon and said object; and
determining from said distances from each of said beacons to said object and from said beacon positions the position of said object relative to said one or more beacons.

30. The method of claim 29, wherein said position of said object is compared to a measured position obtained by measuring a displacement of said object from a previous position.

31. The method of claim 29, wherein said step of causing one or more of said beacons to generate a sound comprises the steps of:
causing said object to generate a sound; and
causing each said one or more beacons to detect said sound generated by said device and in response thereto to generate a sound.

32. The method of claim 29 wherein said step of causing one or more of said beacons to generate a sound comprises the steps of:
causing said object to generate a radio signal;

causing said one or more beacons to detect and recognize said radio signal and in response thereto to generate a sound.

33. The method of claim 29, wherein said system includes a plurality of beacons and wherein said step of causing said beacons to generate a sound comprises the steps of:

causing said object to generate a radio signal, said radio signal uniquely identifying one of said plurality of beacons; and causing only said uniquely identified beacon, to generate a sound.

34. The method of claim 29, wherein said step of causing one or more of said beacons to generate a sound comprises the steps of:

causing said object to emit light;

causing each of said one or more beacons to detect said light and in response thereto to generate sound when said light is detected.

35. The method of claim 29 wherein system includes a plurality of beacons and wherein said step of causing said beacons to generate a sound comprises the steps of:

causing said object to generate light, said light uniquely identifying one of said plurality of beacons; and causing only said uniquely identified beacon, to generate a sound.

36. The method of claim 29 wherein said one or more beacons are at least two in number and further wherein said step of causing one or more of said beacons to generate a sound comprises the steps of:

placing within each beacon and within said object a clock;

synchronizing said clocks;

designating a time at which each beacon is to generate a sound; and causing each said beacon to generate said sound at said designated time.

37. A method for determining object positions for a plurality of objects within a gas-filled space in which two or more beacons have been placed, each beacon having a beacon position, said method comprising the steps of:

storing within each of said objects information regarding the position of said one or more beacons;

placing within each beacon and within each said object a clock;

synchronizing said clocks;

designating a time at which each beacon is to generate a sound;

causing each said beacon to generate said sound at said designated time;

measuring a sonic travel time required for each said sound to travel from each said beacon to said object;

calculating from said sonic travel time the distance between each said beacon and each said object; and determining from said distances from each of said beacons to each of said objects and from said beacon positions the positions of each said object relative to said one or more beacons.

38. The method of claim 29 wherein said space is two-dimensional and wherein said number of beacons is at least two.

39. The method of claim 29, wherein said number of beacons is at least three and further wherein at least one of said beacons is positioned such that it is not located along a line extending between any two other beacons.

40. The method of claim 29 wherein said space is three-dimensional and wherein said number of beacons is at least three and further wherein at least one of said beacons is positioned such that it is not located along a line extending between any two other beacons.

41. The method of claim 40 wherein said number of beacons is at least four and further wherein the position of said beacons are noncoplanar.

42. The method of claim 29 wherein said space includes a plurality of beacons, and wherein said step of storing within said object information regarding said positions of said beacons comprises the steps of:

measuring distances to each of said beacons from a plurality of predetermined positions wherein an orientation between each of said predetermined positions is known;

determining the positions of said beacons from said measured distances; and storing within said device said positions of said beacons.

43. The method of claim 29 wherein said space includes a plurality of beacons, and wherein said step of storing within said object information regarding said positions of said beacons comprises the steps of:

a. for each one of said beacons, measuring the distance between said one beacon and the other ones of said plurality of beacons, and measuring the distance between said one beacon and said object; and b. arbitrarily setting the position of said object to a first position within said space;

arbitrarily setting the position of one of said beacons to a second position within said space;

determining the positions of said plurality of beacons from said first and said second positions and from said measured distances; and storing within said device said positions of said beacons.

* * * * *